(12) United States Patent
Oyama

(10) Patent No.: US 12,214,804 B2
(45) Date of Patent: Feb. 4, 2025

(54) VEHICLE DRIVING CONTROL SYSTEM AND VEHICLE TRAFFIC CONTROL APPARATUS

(71) Applicant: SUBARU CORPORATION, Tokyo (JP)

(72) Inventor: Hajime Oyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 199 days.

(21) Appl. No.: 17/554,604

(22) Filed: Dec. 17, 2021

(65) Prior Publication Data

US 2022/0204040 A1 Jun. 30, 2022

(30) Foreign Application Priority Data

Dec. 28, 2020 (JP) .................................. 2020-219594

(51) Int. Cl.
*B60W 60/00* (2020.01)
*G06V 20/54* (2022.01)
(Continued)

(52) U.S. Cl.
CPC ....... *B60W 60/0016* (2020.02); *G08G 1/0116* (2013.01); *G08G 1/16* (2013.01);
(Continued)

(58) Field of Classification Search
None
See application file for complete search history.

(56) References Cited

U.S. PATENT DOCUMENTS

| 6,026,347 A * | 2/2000 | Schuster ................. G08G 1/164 342/71 |
| 2009/0234553 A1* | 9/2009 | Sekiguchi ............. B60W 30/16 701/96 |

(Continued)

FOREIGN PATENT DOCUMENTS

| JP | 2000-306194 A | 11/2000 |
| JP | 2002-140799 A | 5/2002 |

(Continued)

OTHER PUBLICATIONS

Office Action dated Sep. 17, 2024, from corresponding Japanese Application No. 2020-219594, 6 pages.
Office Action dated Jun. 11, 2024, from corresponding JP Application No. 2020-219594, 6 pages.

*Primary Examiner* — Fadey S. Jabr
*Assistant Examiner* — Mario C Gonzalez
(74) *Attorney, Agent, or Firm* — Rimon P.C.

(57) ABSTRACT

A vehicle driving control system includes: a first road-traffic detection information acquisition unit and a first communicator of a mobile body; a road traffic information recognition unit, a control information calculation unit, and a second communicator of a traffic control apparatus; a second road-traffic detection information acquisition unit and a third communicator of a monitoring apparatus; and a driving control execution unit of a vehicle. The first and second road-traffic detection information acquisition units respectively acquire first and second road-traffic detection information. The road traffic information recognition unit recognizes road traffic information from the first and second road-traffic detection information received by the second communicator respectively through the first and third communicators. The control information calculation unit calculates, from the road traffic information, control information for the vehicle. The driving control execution unit controls (Continued)

driving based on the control information received by the first communicator through the second communicator.

4 Claims, 14 Drawing Sheets

(51) Int. Cl.
*G06V 20/56* (2022.01)
*G08G 1/01* (2006.01)
*G08G 1/16* (2006.01)
*H04N 13/239* (2018.01)

(52) U.S. Cl.
CPC ......... *B60W 2554/80* (2020.02); *G06V 20/54* (2022.01); *G06V 20/56* (2022.01); *H04N 13/239* (2018.05)

(56) References Cited

U.S. PATENT DOCUMENTS

| | | | |
|---|---|---|---|
| 2021/0024095 A1* | 1/2021 | Tao | G08G 1/164 |
| 2021/0096918 A1* | 4/2021 | Ogawa | B60R 16/0231 |
| 2021/0291836 A1* | 9/2021 | Cho | B60W 30/18054 |
| 2022/0013008 A1* | 1/2022 | Katz | H04W 4/38 |
| 2022/0019813 A1* | 1/2022 | Satoh | G08G 1/166 |
| 2023/0186768 A1* | 6/2023 | Yoshizawa | G08G 1/205 |

FOREIGN PATENT DOCUMENTS

| | | |
|---|---|---|
| JP | 2007-141145 A | 6/2007 |
| JP | 2013-257667 A | 12/2013 |
| JP | 2019-172113 A | 10/2019 |

* cited by examiner

| VEHICLE ID |
| DATE AND TIME |
| DISTANCE IMAGE |
| POSITION (LATITUDE AND LONGITUDE) |
| ACCELERATION RATE |
| VEHICLE SPEED |
| TRAVELING DIRECTION |
| ⋮ |

FIG. 4

| MONITORING APPARATUS ID |
| DATE AND TIME |
| IMAGE |
| POSITION (LATITUDE AND LONGITUDE) |
| ⋮ |

FIG. 5

VEHICLE DRIVING CONTROL SYSTEM AND VEHICLE TRAFFIC CONTROL APPARATUS

CROSS-REFERENCE TO RELATED APPLICATIONS

The present application claims priority from Japanese Patent Application No. 2020-219594 filed on Dec. 28, 2020, the entire contents of which are hereby incorporated by reference.

BACKGROUND

The technology relates to a vehicle driving control system and a vehicle traffic control apparatus.

To reduce the burden of a driver's driving operation and to improve safety, driving control apparatuses configured to assist the driver's driving operation have been put to practical use in recent vehicles such as automobiles. For this type of driving control apparatus, various techniques related to the following traveling control modes have been developed: a traveling control mode of performing a steering assist control and an acceleration or deceleration control assuming active driving operations performed by the driver; and a traveling control mode, i.e., an automatic driving mode, of causing the vehicle to travel without requiring the driver's driving operation. For example, reference is made to Japanese Unexamined Patent Application Publication No. 2019-172113.

The traveling control by the driving control apparatus is implemented by, for example, an adaptive cruise control (ACC) and a lane keep control, e.g., an active lane keep centering (ALKC) control. Such traveling control makes it possible to cause the vehicle to travel automatically along a traveling lane, while keeping a distance between the vehicle and a preceding vehicle.

The driving control apparatus uses a technique of, upon recognizing an obstacle ahead of the own vehicle by a traveling environment recognition apparatus, performing an emergency braking control, e.g., an autonomous emergency braking (AEB) control, for the obstacle to perform deceleration until a relative speed between the own vehicle and the obstacle becomes zero. The traveling environment recognition apparatus includes an autonomous sensor, such as a camera or a radar. Examples of the obstacle include a vehicle and a pedestrian.

The driving control apparatus also uses a technique of, upon determining that contact with an obstacle is unavoidable by the emergency braking control, performing an emergency steering control for avoidance of contact with the obstacle.

These various driving controls tend to become advanced toward perfection of an automatic driving control not requiring a driver's driving operation even in an emergency, for example.

SUMMARY

An aspect of the technology provides a vehicle driving control system to be applied to a vehicle. The vehicle driving control system includes a first road-traffic detection information acquisition unit, a first communicator, a second communicator, a second road-traffic detection information acquisition unit, a third communicator, a road traffic information recognition unit, a control information calculation unit, and a driving control execution unit. The first road-traffic detection information acquisition unit and the first communicator are to be provided in a mobile body. The road traffic information recognition unit, the control information calculation unit, and the second communicator are to be provided in a traffic control apparatus disposed for each traffic control area. The second road-traffic detection information acquisition unit and the third communicator are to be provided in a monitoring apparatus disposed at a fixed point on a roadside. The driving control execution unit is to be provided in a vehicle. The first road-traffic detection information acquisition unit is configured to acquire first road-traffic detection information. The second road-traffic detection information acquisition unit is configured to acquire second road-traffic detection information. The road traffic information recognition unit is configured to recognize road traffic information on the basis of the first road-traffic detection information received by the second communicator through the first communicator and the second road-traffic detection information received by the second communicator through the third communicator. The control information calculation unit is configured to calculate, on the basis of the road traffic information, control information for the vehicle in a case where the vehicle is present within the traffic control area. The driving control execution unit is configured to perform a driving control on the basis of the control information received by the first communicator through the second communicator.

An aspect of the technology provides a vehicle traffic control apparatus including a communicator, a road traffic information recognition unit, and a control information calculation unit. The communicator is configured to receive first road-traffic detection information transmitted from a mobile body and second road-traffic detection information transmitted from a monitoring apparatus, and to transmit control information to a vehicle present within a traffic control area of the vehicle traffic control apparatus. The monitoring apparatus is disposed at a fixed point on a roadside. The road traffic information recognition unit is configured to recognize road traffic information on the basis of the first road-traffic detection information and the second road-traffic detection information. The control information calculation unit is configured to calculate the control information for the vehicle, on the basis of the road traffic information.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

FIG. 4 is an explanatory diagram illustrating road-traffic detection information that is transmitted from the vehicle driving control apparatus according to one example embodiment of the technology.

FIG. 5 is an explanatory diagram illustrating road-traffic detection information that is transmitted from the monitoring apparatus according to one example embodiment of the technology.

DETAILED DESCRIPTION

Figure 1:
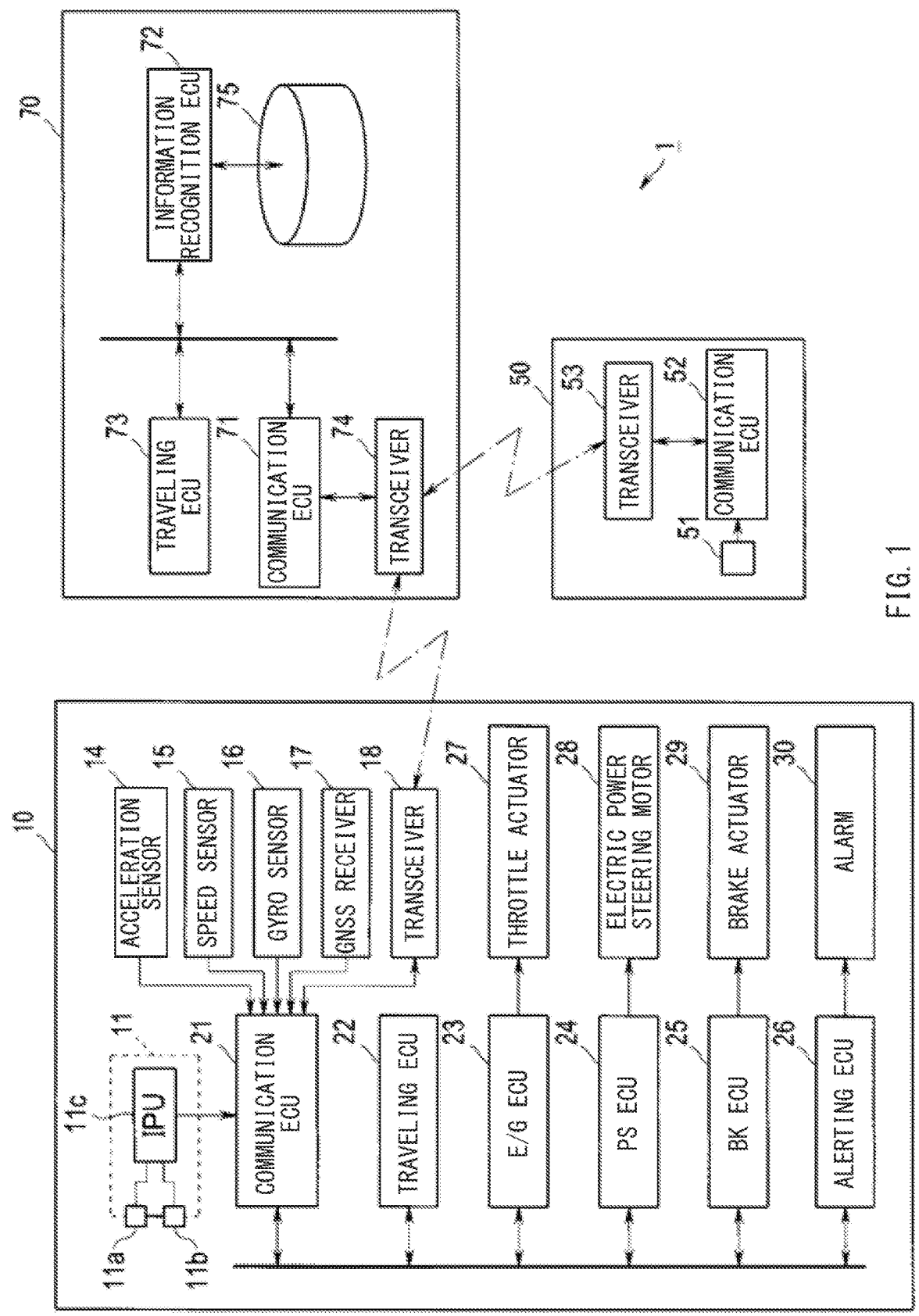
FIG. 1 is an outline configuration diagram illustrating a vehicle driving control system according to one example embodiment of the technology.

To advance the driving control, it may be necessary to acquire diverse pieces of information around the own vehicle by using a plurality of autonomous sensors, for example. In addition, it may be necessary to use a control unit with high calculation capability, to recognize a traveling environment around the own vehicle on the basis of the acquired diverse pieces of information and to calculate control information for a driving control with high precision.

On the other hand, it is desired to widely apply, to vehicles with various specifications, a driving control related to safety, such as a control for avoidance of contact with an obstacle, out of various driving controls. For calculation of control information of such a driving control related to safety, it is desired to apply constantly developed latest control programs, for example, at any time.

It is desirable to provide a vehicle driving control system and a vehicle traffic control apparatus that make it possible to apply the latest driving control to vehicles with various specifications, without mounting complicated systems on the vehicles.

In the following, some example embodiments of the technology are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, a dimension of each of the elements, a material of each of the elements, a ratio between the elements, relative positional relationship between the elements, and any other specific numerical value are illustrative only for easier understanding and not to be construed as limiting to the technology unless otherwise stated. Further, elements in the following example embodiments which are not recited in a most-generic independent claim of the disclosure are optional and may be provided on an as-needed basis. Throughout the specification and the drawings, elements having substantially the same function and configuration are denoted with the same numerals to avoid redundant description.

Figure 2:
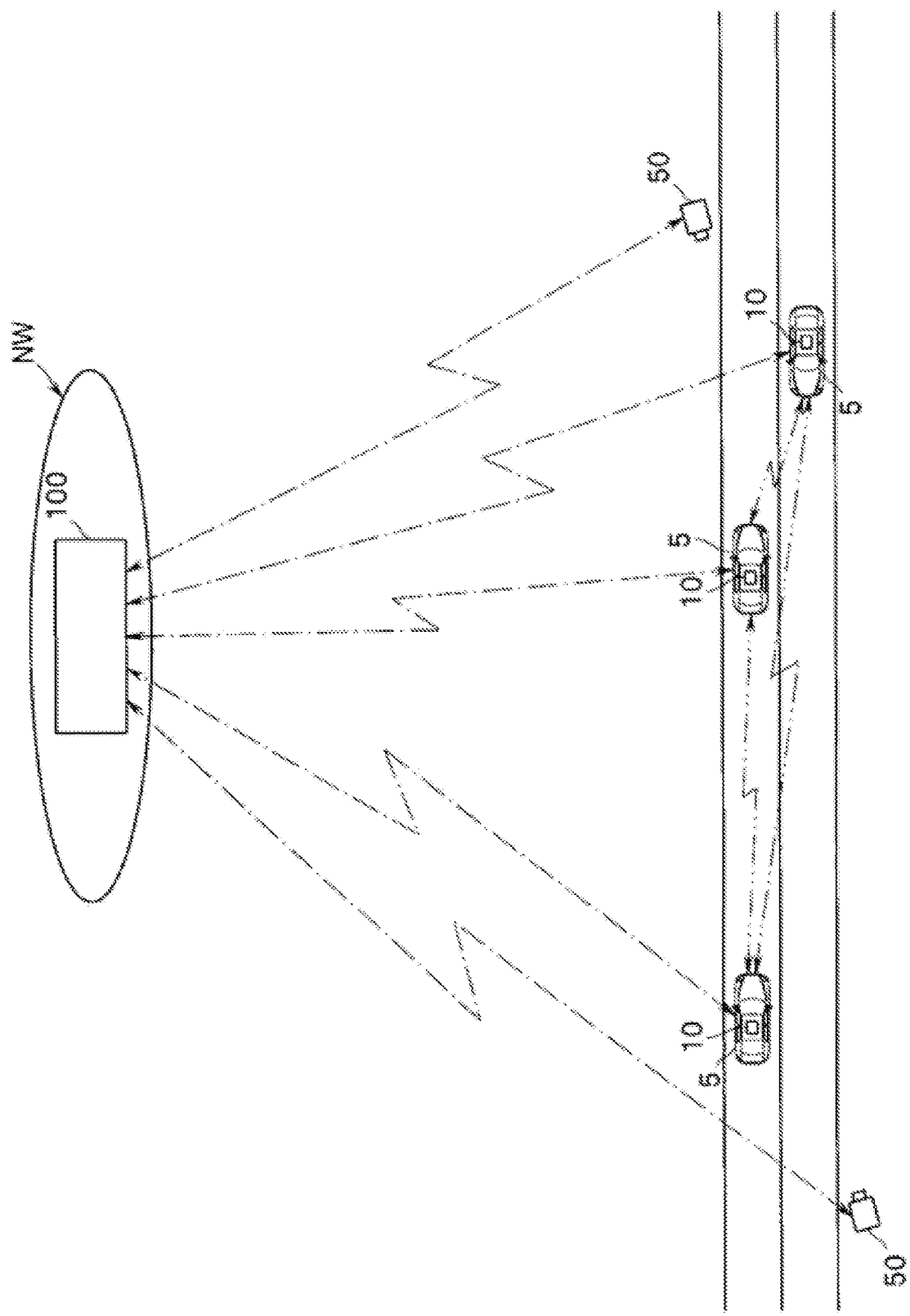
FIG. 2 is an explanatory diagram illustrating vehicle driving control apparatuses and monitoring apparatuses coupled to a traffic control apparatus by high-speed wireless communication, according to one example embodiment of the technology.
Figure 3:
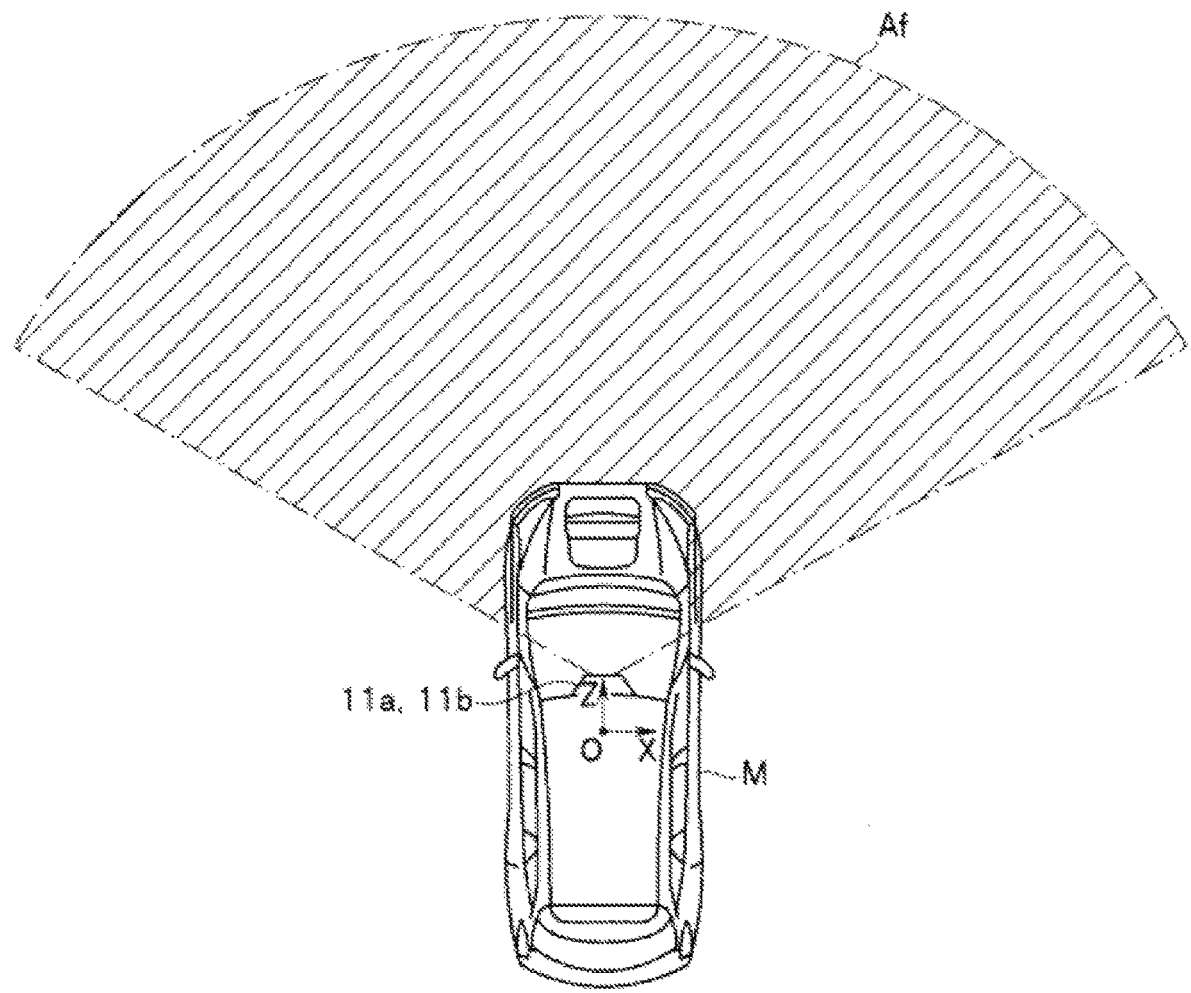
FIG. 3 is an explanatory diagram illustrating a region monitored by a stereo camera according to one example embodiment of the technology.

FIG. 1 to FIG. 10 are related to a first example embodiment of the technology. FIG. 1 is an outline configuration diagram illustrating a vehicle driving control system. FIG. 2 is an explanatory diagram illustrating vehicle driving control apparatuses and monitoring apparatuses coupled to a traffic control apparatus by high-speed wireless communication.

As illustrated in FIG. 1, a driving control system 1 according to the example embodiment may include driving control apparatuses 10 mounted on respective vehicles 5, monitoring apparatuses 50 provided along a road, and a traffic control apparatus 70. The traffic control apparatus 70 may include a short-range server provided in a network environment NW. In one embodiment, the vehicle 5 may serve as a "mobile body".

The driving control apparatus 10 may include a camera unit 11, for example, as an autonomous sensor that detects a traveling environment outside the vehicle. The driving control apparatus 10 may also include a communication control unit (hereinafter referred to as a "communication ECU") 21, a traveling control unit (hereinafter referred to as a "traveling ECU") 22, an engine control unit (hereinafter referred to as an "E/G ECU") 23, a power steering control unit (hereinafter referred to as a "PS ECU") 24, a brake control unit (hereinafter referred to as a "BK ECU") 25, and an alerting control unit (hereinafter referred to as an "alerting ECU"). These control units 21 to 26 may be coupled to each other via an in-vehicle communication line, such as a controller area network (CAN).

The camera unit 11 may be, for example, fixed at an upper-middle position of a front part in a vehicle compartment of the vehicle. The camera unit 11 may include an in-vehicle camera and an image processing unit (IPU) 11c. The in-vehicle camera may be a stereo camera including a main camera 11a and a subsidiary camera 11b.

The main camera 11a and the subsidiary camera 11b may, for example, sense a real space ahead of the vehicle 5. The main camera 11a and the subsidiary camera 11b may be disposed, for example, at respective positions bilaterally symmetrical about the middle in a width direction of the vehicle 5. The main camera 11a and the subsidiary camera 11b may perform stereo imaging of a region Af (see FIG. 3) ahead of the vehicle 5 from different viewpoints.

The IPU 11c may perform predetermined processing on information of images, captured by the stereo imaging by the main camera 11a and the subsidiary camera 11b, of a traveling environment ahead of the vehicle 5. The IPU 11c may thus generate image information that includes distance information determined on the basis of an amount of shift in position of a corresponding target in the images. In other words, the IPU 11c may generate distance image information.

To the communication ECU 21 may be coupled a transceiver compliant with a high-reliability and low-delay communication system (e.g., a fifth-generation mobile communication system), as a transceiver that performs wireless communication with the traffic control apparatus 70 and the driving control apparatus 10 of another vehicle 5.

The communication ECU 21 may have an input terminal coupled to the camera unit 11 and input terminals coupled to various sensors to be used to estimate a position of the vehicle 5 (i.e., an own vehicle position). Examples of the various sensors may include an acceleration sensor 14, a speed sensor 15, a gyro sensor 16, and a GNSS receiver 17. The acceleration sensor 14 may detect a longitudinal acceleration rate and a lateral acceleration rate of the vehicle 5. The speed sensor 15 may detect, for example, a speed of rotation of each of a front-right wheel, a front-left wheel, a rear-right wheel, and a rear-left wheel of the vehicle 5. The gyro sensor 16 may detect an angular velocity or angular acceleration of the vehicle 5. The GNSS receiver 17 may receive positioning signals from a plurality of positioning satellites.

The communication ECU 21 may generate road-traffic detection information, i.e., first road-traffic detection information, including various pieces of information supplied from, for example, the camera unit 11, the acceleration sensor 14, the speed sensor 15, the gyro sensor 16, and the GNSS receiver 17 described above. The communication ECU 21 may transmit the road-traffic detection information to the traffic control apparatus 70 every preset control cycle.

In one example, the communication ECU 21 may generate the road-traffic detection information (i.e., the first road-traffic detection information) including a vehicle ID of the vehicle 5, date and time of transmission, a distance image, the position, e.g., a latitude and a longitude, of the vehicle 5, the acceleration rate of the vehicle 5, the speed of the vehicle 5, and a traveling direction of the vehicle 5, as illustrated in FIG. 4. The communication ECU 21 may transmit the generated first road-traffic detection information to the traffic control apparatus 70 through the transceiver 18.

In addition, the communication ECU 21 may receive, through the transceiver 18, road map information transmitted as appropriate from the traffic control apparatus 70. The road map information will be described later.

The road map information that is transmitted from the traffic control apparatus 70 may be map information in which road traffic information that changes from moment to moment is reflected in real time on the basis of information collected from, for example, each vehicle 5 and each monitoring apparatus 50 present within a predetermined traffic control area.

The communication ECU 21 may also receive, through the transceiver 18, control information transmitted as appropriate from the traffic control apparatus 70. The control information may include, for example, a target deceleration rate to be used to perform a deceleration control of the vehicle 5 in an emergency where the vehicle 5 is likely to come into contact with an obstacle. Upon receiving the target deceleration rate, the communication ECU 21 may supply the received target deceleration rate to the E/G ECU 23 and the BK ECU 25. This enables the E/G ECU 23 and the BK ECU 25 to execute the deceleration control based on the target deceleration rate as an interrupt control.

The control information may also include, for example, a target steering angle to be used to perform a steering control of the vehicle 5 in an emergency. Upon receiving the target steering angle, the communication ECU 21 may supply the received target steering angle to the PS ECU 24. This enables the PS ECU 24 to execute the steering control based on the target steering angle as an interrupt control.

In a case where there is already an external input in response to the emergency, such as an operation of a steering wheel from a driver's seat of the vehicle 5, a steering amount of the steering wheel may be considered in the target steering angle, instead of supplying the target steering angle for performing the steering control itself.

In other words, in the example embodiment, each piece of control information that is transmitted from the traffic control apparatus 70 may have higher priority than control information calculated by the traveling ECU 22 of the vehicle 5. The control information calculated by the traveling ECU 22 will be described later.

As described above, in one embodiment, the camera unit 11, the acceleration sensor 14, the speed sensor 15, the gyro sensor 16, and the GNSS receiver 17, for example, may serve as a "first road-traffic detection information acquisition unit", and the transceiver 18 may serve as a "first communicator". Note that the communication ECU 21 may also be configured to transmit, through the transceiver 18, the first road-traffic detection information to another vehicle 5 present around the vehicle 5 (see FIG. 2).

The traveling ECU 22 may calculate control information for the vehicle 5, i.e., the own vehicle, on the basis of the road map information received from the traffic control apparatus 70. In the example embodiment, the traveling ECU may mainly calculate control information related to an improvement in a driver's convenience.

For example, the traveling ECU 22 may calculate a target acceleration or deceleration rate, as control information for an adaptive cruise control (ACC), on the basis of the road map information. In other words, in a case where a preceding vehicle is recognized as being present ahead on a lane on which the own vehicle is traveling on the basis of the road map information, the traveling ECU 22 may calculate the target acceleration or deceleration rate to be used to cause the own vehicle to travel to follow the preceding vehicle while keeping a predetermined distance between the own vehicle and the preceding vehicle. In a case where no preceding vehicle is recognized as being present ahead on the lane on which the own vehicle is traveling on the basis of the road map information, the traveling ECU 22 may calculate the target acceleration or deceleration rate to be used to cause the own vehicle to travel at a constant set vehicle speed. The traveling ECU 22 may supply the calculated target acceleration or deceleration rate to the E/G ECU 23 and the BK ECU 25. This enables the E/G ECU 23 and the BK ECU 25 to execute an acceleration or deceleration control based on the target acceleration or deceleration rate.

For example, the traveling ECU 22 may calculate a target steering angle, as control information for a lane keep control, e.g., an active lane keep centering (ALKC) control, on the basis of the road map information. In other words, the traveling ECU 22 may calculate the target steering angle to be used to keep the own vehicle at the middle of the lane on which the own vehicle is traveling, on the basis of the road map information. The traveling ECU 22 may supply the calculated target steering angle to the PS ECU 24. This enables the PS ECU 24 to execute a steering control based on the target steering angle.

The E/G ECU 23 may have an output terminal coupled to a throttle actuator 27. The throttle actuator 27 may open and close a throttle valve of an electronic control throttle device disposed on a throttle body of an engine. The throttle actuator 27 may open or close the throttle valve in response to a driving signal from the E/G ECU 23 to regulate an intake air flow, thereby generating an engine output at a desired level.

The PS ECU 24 may have an output terminal coupled to an electric power steering motor 28. The electric power steering motor 28 may impart a steering torque to a steering mechanism using a rotary power of the motor. The electric power steering motor 28 may generate a desired steering angle in response to a driving signal from the PS ECU 24.

The BK ECU 25 may have an output terminal coupled to a brake actuator 29. The brake actuator 29 may regulate a brake hydraulic pressure to be applied to a brake wheel cylinder of each of the wheels. When the brake actuator 29 is driven in response to a driving signal from the BK ECU 25, the brake wheel cylinder may generate a brake force on each of the wheels, which forcibly decelerates the vehicle 5.

The alerting ECU 26 may have an output terminal coupled to an alarm 30. The alarm 30 may output a predetermined alert to the driver. The alarm 30 may include, for example, a multi-information display and a speaker provided on an instrument panel. The alarm 30 may present a predetermined warning display or output an alert sound to the driver, in response to a driving signal from the alerting ECU 26.

As described above, in one embodiment, the E/G ECU 23, the PS ECU 24, the BK ECU 25 may serve as a "driving control execution unit".

The monitoring apparatuses 50 may be roadside infrastructures for observation of a traveling environment, for example. The monitoring apparatuses 50 are disposed at fixed points at predetermined intervals along a roadside. Each monitoring apparatus 50 may include, for example, a camera unit 51 and a communication ECU 52.

The camera unit 51 may include a monocular camera, for example. The camera unit 51 may be disposed to have an optical axis inclined at a predetermined depression angle from above the roadside toward a road surface. This enables the camera unit 51 to detect image information including vehicles traveling on a road, for example.

To the communication ECU 52 may be coupled a transceiver 53 compliant with a high-reliability and low-delay communication system (e.g., a fifth-generation mobile communication system), as a transceiver that performs wireless communication with the traffic control apparatus 70. The communication ECU 52 may have an input terminal coupled to the camera unit 51.

The communication ECU 52 may generate road-traffic detection information, i.e., second road-traffic detection information, including image information supplied from the camera unit 51 described above. The communication ECU 52 may transmit the road-traffic detection information to the traffic control apparatus 70 every preset control cycle.

In one example, the communication ECU 52 may generate the road-traffic detection information including an ID of the monitoring apparatus 50, date and time of transmission, an image, and a position, e.g., a latitude and a longitude, of the monitoring apparatus 50, as illustrated in FIG. 5. The communication ECU 52 may transmit the generated road-traffic detection information to the traffic control apparatus 70 through the transceiver 53.

As described above, in one embodiment, the camera unit 51 may serve as a "second road-traffic detection information acquisition unit", and the transceiver 53 may serve as a "third communicator".

The traffic control apparatus 70 may be an edge server, i.e., a MEC server, of a network environment based on edge computing, for example. The traffic control apparatus 70 is disposed for each predetermined traffic control area. The traffic control apparatus 70 may include, for example, a communication control unit (hereinafter referred to as a "communication ECU") 71, a road traffic information recognition control unit (hereinafter referred to as an "information recognition ECU") 72, and a traveling control unit (hereinafter referred to as a "traveling ECU") 73. These control units 71 to 73 may be coupled to each other via a predetermined communication line. The control units 71 to 73 may have higher-performance specifications than the control units mounted on the vehicle 5. Note that the control units 71 to 73 may be configured by a single control unit.

To the communication ECU 71 may be coupled a transceiver compliant with a high-reliability and low-delay communication system (e.g., a fifth-generation mobile communication system), as a transceiver that performs wireless communication with the driving control apparatus 10 of each vehicle 5 and each monitoring apparatus 50.

When the transceiver 74 receives road-traffic detection information from the driving control apparatus 10 of each vehicle 5 and each monitoring apparatus 50, the communication ECU 71 may supply the received road-traffic detection information to the information recognition ECU 72.

In addition, when control information for a vehicle 5 is supplied from the traveling ECU 73, the communication ECU 71 may transmit the supplied control information to the corresponding vehicle 5 through the transceiver 74. The control information will be described later.

When road map information is supplied from the information recognition ECU 72, the communication ECU 71 may transmit the supplied road map information to each vehicle 5 through the transceiver 74.

As described above, in one embodiment, the transceiver 74 may serve as a "second communicator" or a "communicator".

To the information recognition ECU 72 may be coupled a high-precision road map database 75. The high-precision road map database 75 may be a large-capacity storage medium such as a hard disk drive (HDD). The high-precision road map database 75 may hold high-precision road map information, e.g., a dynamic map, as information to be used in performing a traveling control of each vehicle 5 traveling on a road. The high-precision road map information may include three layers of information of static information, quasi-dynamic information, and dynamic information. The static information may mainly configure road information. The quasi-dynamic information and the dynamic information may mainly configure traffic information.

The static information may include, for example, information to be updated within every month, such as information on roads, structures on roads, lanes, road surfaces, and permanent regulation.

The quasi-dynamic information may include, for example, information to be updated within every minute, such as information on actual traffic congestion and regulation at the time of observation, temporary traffic obstruction due to fallen objects and obstacles, actual accidents, and weather in a narrow area.

The dynamic information may include, for example, information to be updated within every second, such as information transmitted and exchanged between mobile bodies, and information on the current indication of traffic lights, pedestrians and two-wheeled vehicles at an intersection, and vehicles going straight through an intersection.

Such road map information may be maintained and updated on cycles from the reception of the information to the reception of subsequent information from the driving control apparatus 10 of each vehicle 5 and each monitoring apparatus 50. The updated information may be supplied to the communication ECU 71 and the traveling ECU 73 as appropriate. As road map information to be supplied to the communication ECU 71, it is possible to supply all of the road map information within the traffic control area. However, in consideration of communication load with the communication ECU 21 of the vehicle 5, only road map information to be used to calculate control information by the traveling ECU 22 of each vehicle 5 may be extracted. The extracted road map information may be supplied as individual road map information associated with the ID of each vehicle 5.

In updating the road map information, the information recognition ECU 72 may analyze the road-traffic detection information received from the driving control apparatus 10 of each vehicle 5 and the road-traffic detection information received from each monitoring apparatus 50, and perform a process of recognizing road traffic information.

For example, upon receiving the road-traffic detection information from the driving control apparatus 10, the information recognition ECU 72 may recognize the current position of the vehicle 5 on a road map, and may also recognize a movement direction and a movement speed, for example, of the vehicle 5.

In addition, the information recognition ECU 72 may determine lane lines that divide a road around the vehicle 5 on the basis of the received distance image information, for example. The information recognition ECU 72 may also determine a road curvature [1/m] of lane lines that define right and left of a traveling course along which the vehicle 5 travels, and a width (i.e., a lane width) between the lane lines.

The information recognition ECU 72 may further perform predetermined pattern matching on the distance image information to recognize a three-dimensional object. Examples of the three-dimensional object may include a guard rail and a curbstone that extend along the road, and a pedestrian, a two-wheeled vehicle, and a vehicle other than a two-wheeled vehicle that are present on the road. In recognizing the three-dimensional object, the information recognition ECU 72 may recognize, for example, a type of the three-dimensional object, a distance from the vehicle 5 to the three-dimensional object, and a speed of the three-dimensional object.

Similarly, upon receiving the road-traffic detection information from the monitoring apparatus 50, the information recognition ECU 72 may perform the process of recognizing the road traffic information by, for example, performing a known image recognition process on the basis of the received image information.

Upon recognizing the road traffic information on the basis of the road-traffic detection information from the driving control apparatus 10 and the monitoring apparatus 50 in this manner, the information recognition ECU 72 may update the road map information held in the high-precision road map database 75 at any time, on the basis of the recognized road traffic information. This information update may be performed for not only the static information, but also the quasi-dynamic information and the dynamic information. This allows the road map information to include the latest road traffic information acquired by communication with the outside of the traffic control apparatus 70, and allows information on mobile bodies, such as vehicles, traveling on a road to be updated in real time.

As described above, in one embodiment, the information recognition ECU 72 may serve as a "road traffic information recognition unit".

The traveling ECU 73 calculates control information for each vehicle 5 present within the traffic control area of the traffic control apparatus 70. As the control information, the traveling ECU 73 may calculate at least control information to be used to allow each vehicle 5 to avoid contact with an obstacle in an emergency. Various programs to be used to calculate the control information by the traveling ECU 73 may be updatable to latest programs at any time, for example, through the network environment NW.

In one example, when an obstacle that is likely to come into contact with the vehicle 5 is detected ahead along the traveling course of the vehicle 5 on the basis of the road map information reflecting the road traffic information, the traveling ECU 73 may calculate control information for an emergency braking control, e.g., an autonomous emergency braking (AEB) control, of causing the vehicle to stop before the obstacle.

In the example embodiment, an obstacle may refer to a three-dimensional object that is likely to come into contact with the vehicle 5. In one example, the obstacle may refer to a three-dimensional object at least partly overlapping with the vehicle 5 ahead along the traveling course of the vehicle 5. Examples of the obstacle may include, as well as another vehicle 5 stopped near a road shoulder, a preceding vehicle 5 that has suddenly decelerated or stopped ahead of the vehicle 5, and a pedestrian crossing the traveling course.

The control information for the emergency braking control may be set on the basis of the obstacle recognized by the information recognition ECU 72. For example, control information for a primary braking control and control information for a secondary braking control may be set in sequential phases.

The primary braking control may be an alert braking control of prompting the driver to perform an operation of avoiding contact with the obstacle. The primary braking control may be a gentle braking control of decelerating the vehicle 5 by using a relatively low deceleration rate a0.

The secondary braking control may be a main braking control performed in a case where the driver does not perform an appropriate contact avoidance operation in response to the primary braking control. The secondary braking control may be a strong braking control of decelerating the vehicle 5 until a relative speed with respect to the obstacle becomes "0" by using a deceleration rate ap higher than in the primary braking control.

The pieces of control information for these braking controls may be set in a case where the relationship between a relative speed Vrel and a relative distance D between the vehicle 5 and the obstacle becomes equal to or less than a threshold.

In the example embodiment, for example, the traveling ECU 73 may calculate braking control start distances D1th and D2th serving as distance thresholds, on the basis of the relationship between the relative speed Vrel and an overlap ratio R between the vehicle 5 and the obstacle. To calculate these distance thresholds D1th and D2th, the traveling ECU 73 may have a map for setting of a primary braking control start distance and a map for setting of a secondary braking control start distance stored therein. The maps may be preset on the basis of an experiment or a simulation, for example. These maps may be set as follows, for example: as the relative speed Vrel becomes lower, the distance threshold is set to a smaller value to delay a deceleration start timing; and, as the overlap ratio R becomes lower, the distance threshold is set to a smaller value to delay the deceleration start timing. In other words, the maps may be set to leave, as the relative speed Vrel becomes lower and the overlap ratio R becomes lower, more room for the driver to avoid contact with the obstacle by his/her own driving operation.

In a case where the relative distance D becomes equal to or less than the primary braking control start distance D1th, the traveling ECU 73 may set the target deceleration rate a0 as the control information for the vehicle 5.

In a case where an appropriate avoidance operation, for example, is not performed by the driver during the primary braking control, and the relative distance D becomes equal to or less than the secondary braking control start distance D2th, the traveling ECU 73 may set the target deceleration rate ap as the control information for the vehicle 5.

Note that time-to-contact (TTC) to be described later may be a parameter having substantially the same meaning as the relative distance D in the braking control. Therefore, it is also possible to use the TTC as a parameter indicating the relationship between the relative speed Vrel and the relative distance D.

During the execution of the secondary braking control, the traveling ECU 73 may calculate the TTC that is time to be taken until the vehicle 5 comes into contact with the obstacle. The TTC may be, for example, a value expressed by (relative distance D)/(relative speed Vrel) and calculated by dividing the relative distance D between the vehicle 5 and the front obstacle, by the relative speed Vrel between the vehicle 5 and the front obstacle.

In a case where the TTC is equal to or less than a preset threshold Tth, the traveling ECU 73 may determine that it is difficult to avoid contact with the obstacle by the braking control, and may calculate control information for an emergency steering control, e.g., an autonomous emergency steering (AES) control, to perform emergency contact avoidance for the obstacle by steering. The threshold Tth may be a threshold to be used to determine, in the relationship with the TTC, whether there is time left to avoid contact between the vehicle 5 and the obstacle by the emergency braking control.

For this steering control, the traveling ECU 73 may calculate a target lateral position for the vehicle 5 to avoid contact with the obstacle. The traveling ECU 73 may also calculate, as a target path for the emergency steering control, a first target path from a control start position to an intermediate position between the control start position and the target lateral position, and a second target path from the intermediate position to the target lateral position. For example, the vehicle position at a time when the TTC becomes equal to or less than the set threshold Tth may be regarded as the control start position, and lateral jerk allowed in accordance with the vehicle speed may be used for the calculation. The traveling ECU 73 may set a target steering angle to be used to cause the vehicle 5 to travel along the target path as the control information.

Furthermore, in a case where a behavior of the vehicle 5 for which the control information has been set has an influence on another vehicle 5, the traveling ECU 73 may calculate control information for contact avoidance also for the other vehicle 5, on an as-needed basis.

Each piece of control information thus calculated may be supplied from the traveling ECU 73 to the communication ECU 71. The communication ECU 71 may transmit each piece of control information to the corresponding vehicle 5 through the transceiver 74. As described above, in one embodiment, the traveling ECU 73 may serve as a "control information calculation unit".

Figure 6:
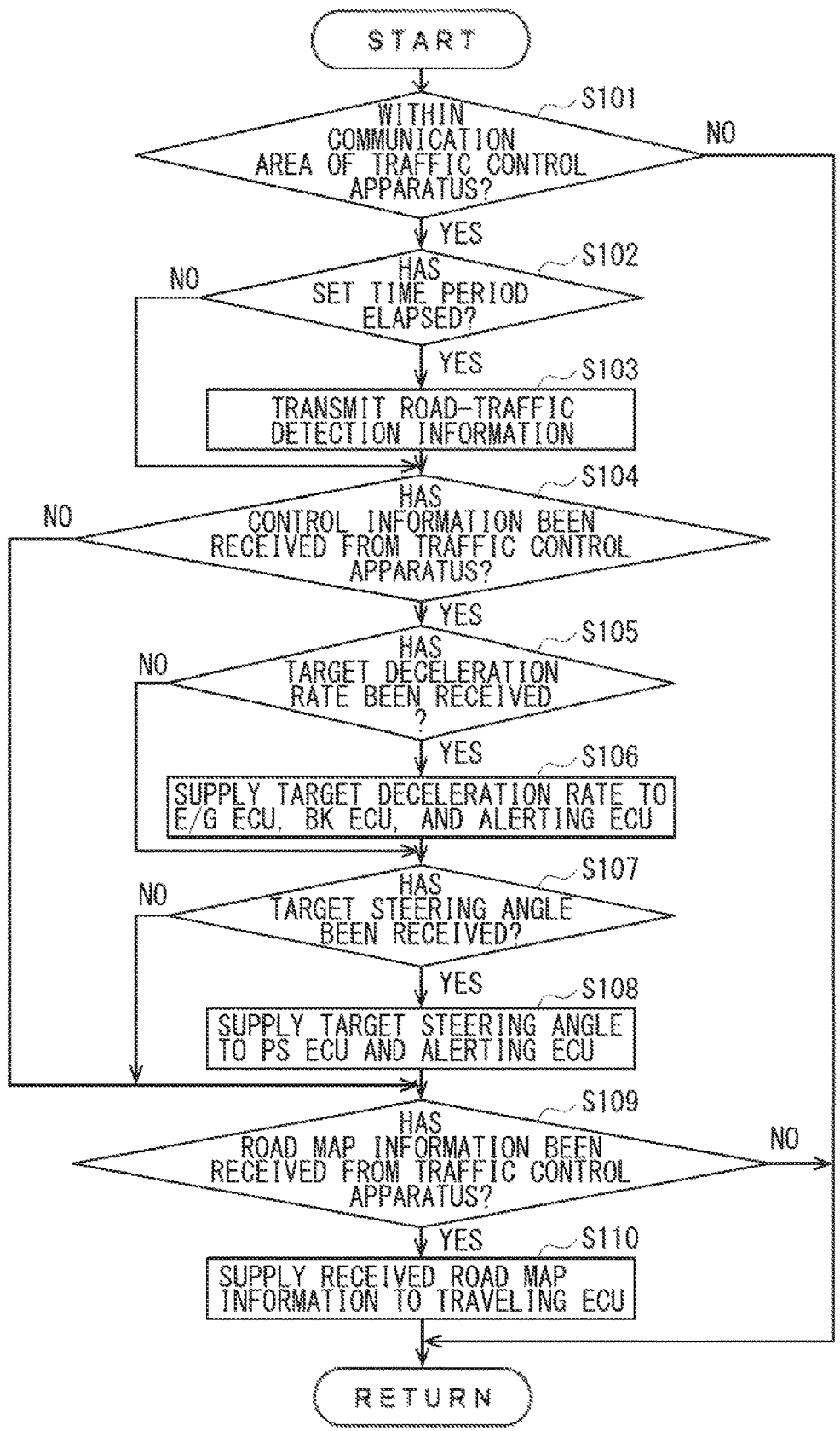
FIG. 6 is a flowchart illustrating a communication control routine that is executed by a communication control unit of the driving control apparatus according to one example embodiment of the technology.

A description is given next of a communication control routine that is executed by the communication ECU 21 of the driving control apparatus 10, with reference to a flowchart illustrated in FIG. 6. This routine may be executed repeatedly every set cycle by the communication ECU 21.

Upon start of the routine, the communication ECU 21 may check whether the vehicle 5 is present within a communication area, i.e., the traffic control area, of the traffic control apparatus 70 in step S101.

If the communication ECU 21 determines in step S101 that the vehicle 5 is present out of the communication area (step S101: NO), the communication ECU 21 may exit the routine.

If the communication ECU 21 determines in step S101 that the vehicle 5 is present within the communication area (step S101: YES), the communication ECU 21 may cause the flow to proceed to step S102, and check whether a set time period (e.g., 200 msec) has elapsed from the previous transmission of first road-traffic detection information.

If the communication ECU 21 determines in step S102 that the set time period has elapsed (step S102: YES), the communication ECU 21 may cause the flow to proceed to step S103, transmit first road-traffic detection information through the transceiver 18, and thereafter cause the flow to proceed to step S104.

If the communication ECU 21 determines in step S102 that the set time period has not elapsed (step S102: NO), the communication ECU 21 may cause the flow to proceed to step S104.

When the flow proceeds from step S102 or step S103 to step S104, the communication ECU 21 may check whether control information has been received, through the transceiver 18, from the traffic control apparatus 70 corresponding to the traffic control area where the vehicle 5 is currently present.

If the communication ECU 21 determines in step S104 that control information has not been received (step S104: NO), the communication ECU 21 may cause the flow to proceed to step S109.

If the communication ECU 21 determines in step S104 that control information has been received (step S104: YES), the communication ECU 21 may cause the flow to proceed to step S105, and check whether the received control information includes a target deceleration rate.

If the communication ECU 21 determines in step S105 that the received control information includes a target deceleration rate (step S105: YES), the communication ECU 21 may cause the flow to proceed to step S106, supply the target deceleration rate to the E/G ECU 23, the BK ECU 25, and the alerting ECU 26, and thereafter cause the flow to proceed to step S107. Thus, the E/G ECU 23 and the BK ECU 25 may perform the emergency braking control for an obstacle on the basis of the supplied target deceleration rate. The alerting ECU 26 may perform a predetermined alerting control corresponding to the target deceleration rate as appropriate.

If the communication ECU 21 determines in step S105 that the received control information does not include a target deceleration rate (step S105: NO), the communication ECU 21 may cause the flow to proceed to step S107.

When the flow proceeds from step S105 or step S106 to step S107, the communication ECU 21 may check whether the received control information includes a target steering angle.

If the communication ECU 21 determines in step S107 that the received control information includes a target steering angle (step S107: YES), the communication ECU 21 may cause the flow to proceed to step S108, supply the target steering angle to the PS ECU 24 and the alerting ECU 26, and thereafter cause the flow to proceed to step S109. Thus, the PS ECU 24 may perform the emergency steering control for an obstacle on the basis of the supplied target steering angle. The alerting ECU 26 may perform a predetermined alerting control corresponding to the target steering angle as appropriate.

If the communication ECU 21 determines in step S107 that the received control information does not include a target steering angle (step S107: NO), the communication ECU 21 may cause the flow to proceed to step S109.

When the flow proceeds from step S107 or step S108 to step S109, the communication ECU 21 may check whether road map information has been received, through the transceiver 18, from the traffic control apparatus 70 corresponding to the traffic control area where the vehicle 5 is currently present.

If the communication ECU 21 determines in step S109 that road map information has not been received (step S109: NO), the communication ECU 21 may exit the routine.

If the communication ECU 21 determines in step S109 that road map information has been received (step S109: YES), the communication ECU 21 may cause the flow to proceed to step S110, supply the received road map information to the traveling ECU 22, and thereafter exit the routine.

Although a detailed description is omitted, also the communication ECU 52 of the monitoring apparatus 50 may perform processes similar to step S102 and step S103 described above, and transmit second road-traffic detection information to the traffic control apparatus 70.

Figure 7:
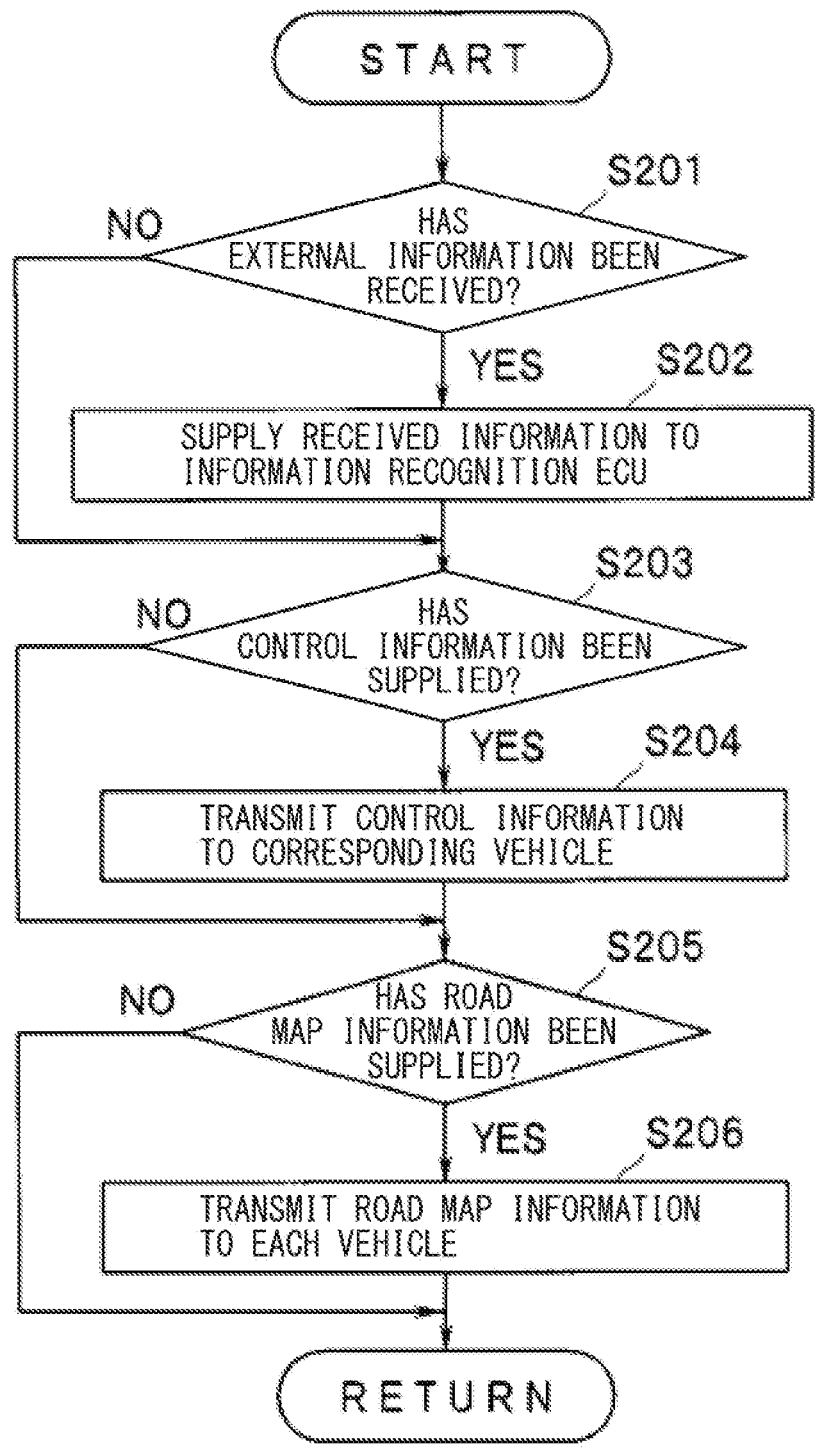
FIG. 7 is a flowchart illustrating a communication control routine that is executed by a communication control unit of the traffic control apparatus according to one example embodiment of the technology.

A description is given next of a communication control that is executed by the communication ECU 71 of the traffic control apparatus 70, with reference to a flowchart of a communication control routine in FIG. 7. This routine may be executed repeatedly every set cycle by the communication ECU 71.

Upon start of the routine, the communication ECU 71 may check whether external information has been received in step S201. In other words, the communication ECU 71 may check whether first road-traffic detection information from the driving control apparatus 10 of the vehicle 5 present within the traffic control area, second road-traffic detection information from the monitoring apparatus 50, or both have been received.

If the communication ECU 71 determines in step S201 that external information has been received (step S201: YES), the communication ECU 71 may cause the flow to proceed to step S202, supply the received information to the information recognition ECU 72, and thereafter cause the flow to proceed to step S203.

If the communication ECU 71 determines in step S201 that external information has not been received (step S201: NO), the communication ECU 71 may cause the flow to proceed to step S203.

When the flow proceeds from step S201 or step S202 to step S203, the communication ECU 71 may check whether control information has been supplied from the traveling ECU 73.

If the communication ECU 71 determines in step S203 that control information has been supplied (step S203: YES), the communication ECU 71 may cause the flow to proceed to step S204, transmit the control information, through the transceiver 74, to the vehicle 5 with the ID corresponding to the supplied control information, and thereafter cause the flow to proceed to step S205.

If the communication ECU 71 determines in step S203 that control information has not been supplied (step S203: NO), the communication ECU 71 may cause the flow to proceed to step S205.

When the flow proceeds from step S203 or step S204 to step S205, the communication ECU 71 may check whether newly updated road map information has been supplied from the information recognition ECU 72.

If the communication ECU 71 determines in step S205 that road map information has been supplied (step S205: YES), the communication ECU 71 may cause the flow to proceed to step S206, transmit the supplied road map information to each vehicle 5 within the traffic control area, and thereafter exit the routine.

If the communication ECU 71 determines in step S205 that road map information has not been supplied (step S205: NO), the communication ECU 71 may exit the routine.

Figure 8:
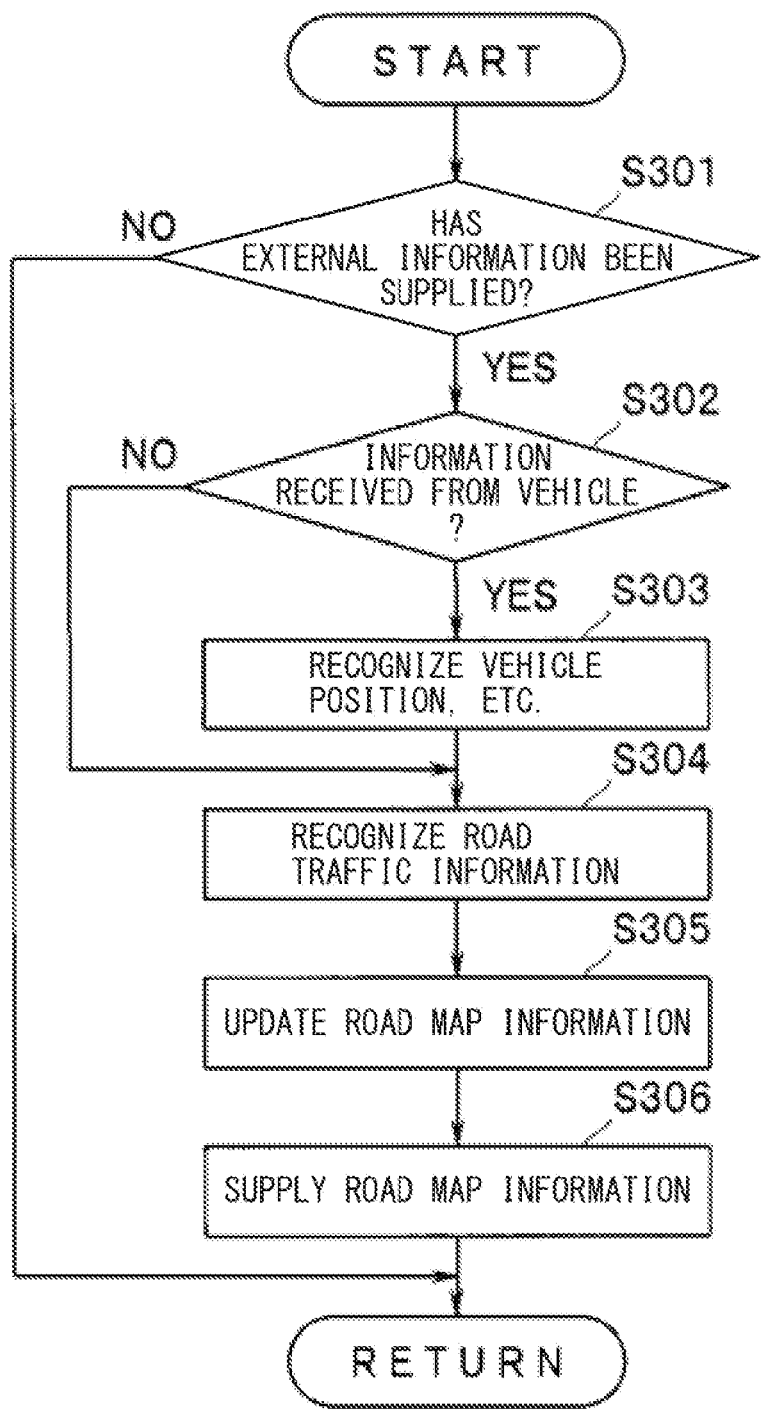
FIG. 8 is a flowchart illustrating a road traffic information recognition routine that is executed by a road traffic information recognition control unit of the traffic control apparatus according to one example embodiment of the technology.

A description is given next of a road traffic information recognition process that is executed by the information recognition ECU 72, with reference to a flowchart of a road traffic information recognition routine illustrated in FIG. 8. This routine may be executed repeatedly every set cycle by the information recognition ECU 72.

Upon start of the routine, the information recognition ECU 72 may check whether external information has been supplied through the communication ECU 71.

If the information recognition ECU 72 determines in step S301 that external information has not been supplied (step S301: NO), the information recognition ECU 72 may exit the routine.

If the information recognition ECU 72 determines in step S301 that external information has been supplied (step S301: YES), the information recognition ECU 72 may cause the flow to proceed to step S302, and check whether the supplied information is information from a vehicle 5, i.e., whether the supplied information is first road-traffic detection information.

If the information recognition ECU 72 determines in step S302 that the supplied information is information from a vehicle 5 (step S302: YES), the information recognition ECU 72 may cause the flow to proceed to step S303. In step S303, the information recognition ECU 72 may recognize, on the basis of the first road-traffic detection information, the current position of the vehicle 5 on the road map, the traveling direction of the vehicle 5, and the speed of the vehicle 5, for example, and thereafter cause the flow to proceed to step S304.

If the information recognition ECU 72 determines in step S302 that the supplied information is not information from a vehicle 5 (step S302: NO), i.e., that the supplied information is second road-traffic detection information, the information recognition ECU 72 may cause the flow to proceed to step S304.

When the flow proceeds from step S302 or step S303 to step S304, the information recognition ECU 72 may recognize road traffic information on the basis of the supplied road-traffic detection information.

For example, in a case of recognizing the road traffic information on the basis of the first road-traffic detection information, the information recognition ECU 72 may recognize, with respect to the vehicle position and the traveling direction, for example, recognized in step S303, various pieces of information, including lane lines on a road, a lane width, and a three-dimensional object such as another vehicle or a pedestrian. The information recognition ECU 72 may further recognize, for example, a movement speed of various three-dimensional objects on the basis of a relative speed with respect to the vehicle 5.

For example, in a case of recognizing the road traffic information on the basis of the second road-traffic detection information, the information recognition ECU 72 may recognize, with respect to coordinates of the monitoring apparatus 50 and an optical axis direction of the camera unit 51, various pieces of information, including lane lines on a road, a lane width, and a three-dimensional object such as another vehicle or a pedestrian. The information recognition ECU 72 may further recognize, for example, a movement speed of various three-dimensional objects.

When the flow proceeds from step S304 to step S305, the information recognition ECU 72 may update road map information with the road traffic information recognized in step S304, for example, and thereafter cause the flow to proceed to step S306.

When the flow proceeds from step S305 to step S306, the information recognition ECU 72 may supply the road map information updated in step S305 to the communication ECU 71 and the traveling ECU 73, and thereafter exit the routine.

Figure 9:
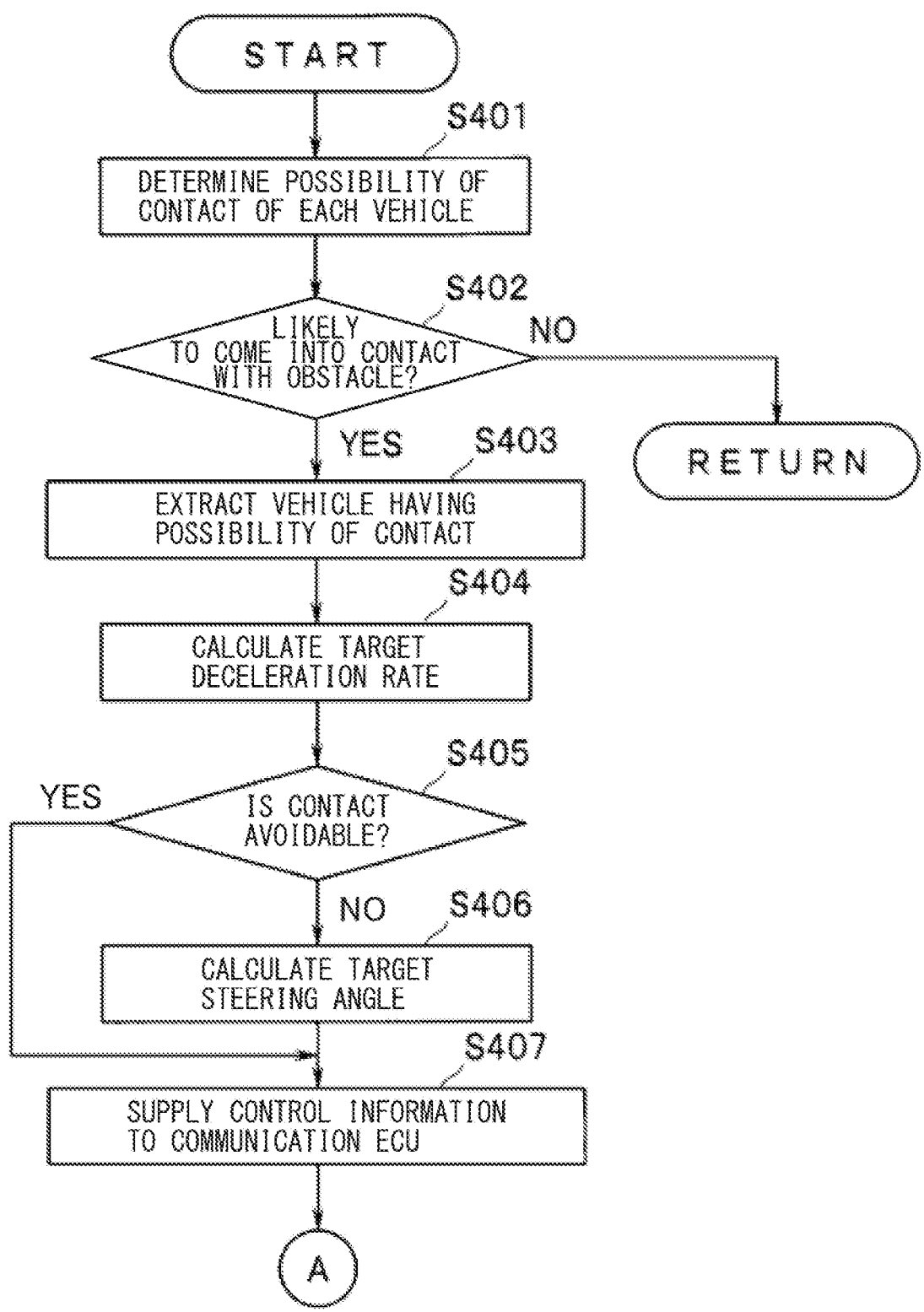
FIG. 9 is a first part of a flowchart illustrating a control information calculation routine that is executed by a traveling control unit of the traffic control apparatus according to one example embodiment of the technology.
Figure 10:
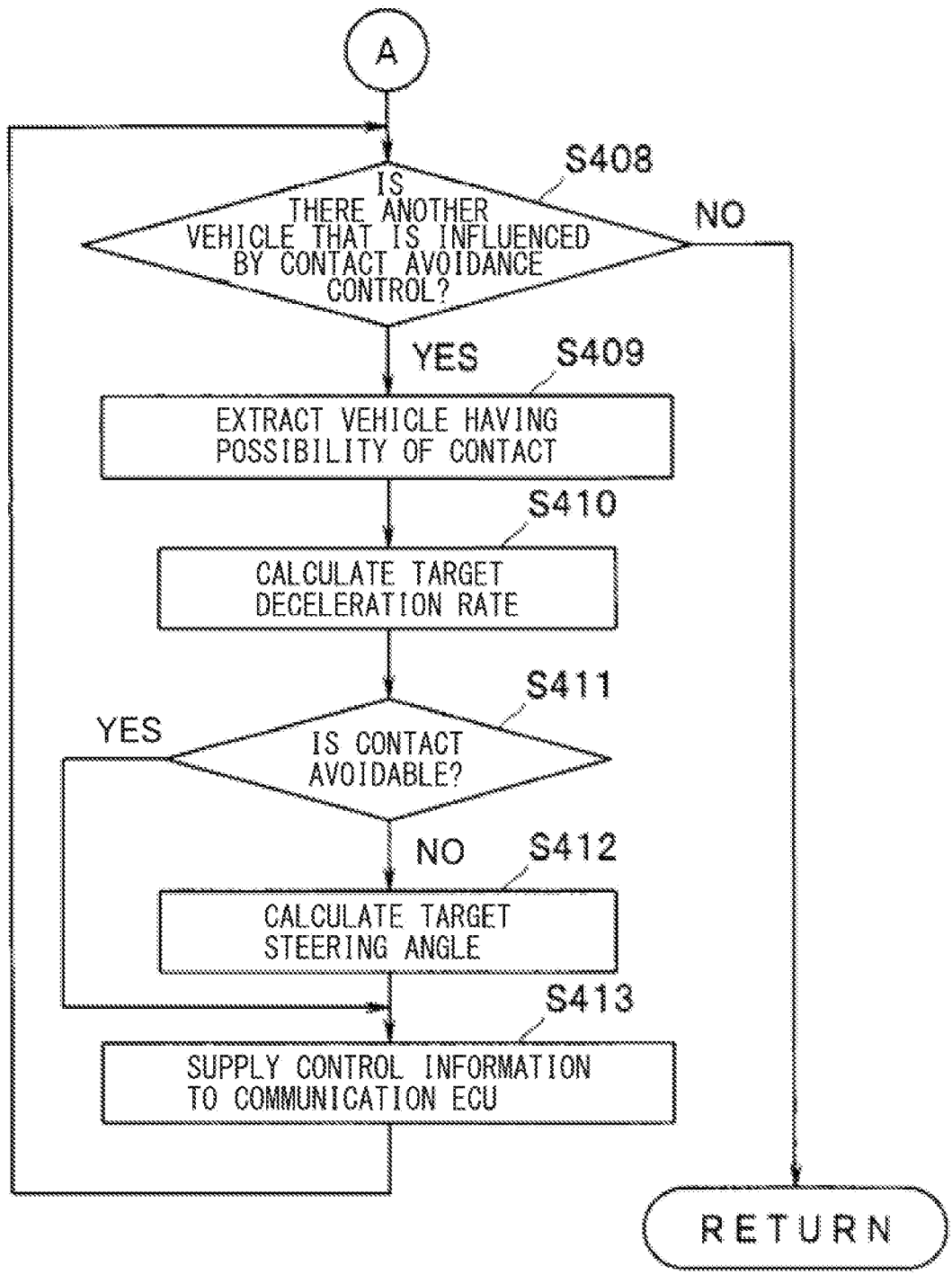
FIG. 10 is a second part of the flowchart illustrating the control information calculation routine that is executed by the traveling control unit of the traffic control apparatus according to one example embodiment of the technology.

A description is given next of a process of calculating control information for each vehicle 5 that is executed by the traveling ECU 73 of the traffic control apparatus 70, with reference to a flowchart of a control information calculation routine illustrated in FIGS. 9 and 10. This routine may be executed repeatedly every set cycle by the traveling ECU 73.

Upon start of the routine, the traveling ECU 73 may determine whether each vehicle 5 present within the traffic control area is likely to come into contact with an obstacle, on the basis of the road traffic information, e.g., on the basis of the road map information reflecting the latest road traffic information, in step S401.

In subsequent step S402, the traveling ECU 73 may check whether, as a result of the determination in step S401 described above, a vehicle 5 that is likely to come into contact with an obstacle is present.

If the traveling ECU 73 determines in step S402 that a vehicle 5 that is likely to come into contact with an obstacle is not present (step S402: NO), the traveling ECU 73 may exit the routine.

If the traveling ECU 73 determines in step S402 that a vehicle 5 that is likely to come into contact with an obstacle is present (step S402: YES), the traveling ECU 73 may cause the flow to proceed to step S403, and extract one or more vehicles 5 that are likely to come into contact with an obstacle, from among the vehicles 5 present within the traffic control area.

In subsequent step S404, the traveling ECU 73 may calculate, as the control information for each vehicle 5 extracted in step S403, the target deceleration rate for each vehicle 5 to avoid contact with the obstacle by the emergency braking control.

In subsequent step S405, the traveling ECU 73 may check, for each vehicle 5, whether contact with the obstacle is avoidable by the emergency braking control.

If the traveling ECU 73 determines in step 405 that contact with the obstacle is avoidable by the emergency braking control (step S405: YES), the traveling ECU 73 may cause the flow to proceed to step S407.

If the traveling ECU 73 determines in step S405 that contact with the obstacle is unavoidable by the emergency braking control (step S405: NO), the traveling ECU 73 may cause the flow to proceed to step S406. In step S406, the traveling ECU 73 may calculate, as the control information for the corresponding vehicle 5, the target steering angle for each vehicle 5 to avoid contact with the obstacle by the emergency steering control.

When the flow proceeds from step S405 or step S406 to step S407, the traveling ECU 73 may supply the control information calculated for each vehicle 5 to the communication ECU 71, and thereafter cause the flow to proceed to step S408.

When the flow proceeds from step S407 to step S408, the traveling ECU 73 may check whether, if a contact avoidance control of the corresponding vehicle 5 is performed on the basis of the control information described above, another vehicle 5 that is influenced by the vehicle 5 is present within the traffic control area. In other words, the traveling ECU 73 may check whether, if the contact avoidance control of the vehicle 5 is performed on the basis of the control information described above, another vehicle 5 that is likely to come into contact with the vehicle 5 subjected to the contact avoidance control newly occurs.

If the traveling ECU 73 determines in step S408 that another vehicle 5 that is influenced by the vehicle 5 is not present (step S408: NO), the traveling ECU 73 may exit the routine.

If the traveling ECU 73 determines in step S408 that another vehicle 5 that is influenced by the vehicle 5 is present (step S408: YES), the traveling ECU 73 may cause the flow to proceed to step S409, and extract one or more new vehicles 5 that have become likely to come into contact with the vehicle 5 subjected to the contact avoidance control.

When the flow proceeds from step S409 to step S410, the traveling ECU 73 may perform, in processes from step S410 to step S413, processes similar to step S404 to step S407 described above on each extracted vehicle 5, and thereafter cause the flow to return to step S408.

According to such an example embodiment, the vehicle driving control system 1 may include the camera unit 11, the transceiver 18, the camera unit 51, the transceiver 53, the transceiver 74, the information recognition ECU 72, the traveling ECU 73, the E/G ECU 23, the PS ECU 24, and the BK ECU 25. The camera unit 11 and the transceiver 18 may be mounted on the vehicle 5. The camera unit 51 and the transceiver 53 are provided in the monitoring apparatus 50 disposed at a fixed point on the roadside. The transceiver 74 is provided in the traffic control apparatus 70 disposed for each predetermined traffic control area. The information recognition ECU 72 is provided in the traffic control apparatus 70, and configured to recognize the road traffic information on the basis of the first road-traffic detection information received by the transceiver 74 through the transceiver 18, and the second road-traffic detection information received by the transceiver 74 through the transceiver 53. The traveling ECU 73 is provided in the traffic control apparatus 70, and configured to calculate the control information for the vehicle 5 present within the traffic control area on the basis of the road traffic information. The E/G ECU 23, the PS ECU 24, and the BK ECU 25 are mounted on the vehicle 5, and configured to perform a driving control on the basis of the control information received by the transceiver 18 through the transceiver 74. This makes it possible to apply the latest driving control to vehicles 5 with various specifications, without mounting complicated systems on the vehicles 5.

For example, the information recognition ECU 72 of the traffic control apparatus 70 recognizes the multiple road traffic information within the traffic control area on the basis of the first road-traffic detection information transmitted from the driving control apparatus 10 of each vehicle 5 and the second road-traffic detection information transmitted from each monitoring apparatus 50. This makes it possible to recognize the road traffic information around the vehicle 5 precisely and efficiently. On the basis of the road traffic information recognized by the information recognition ECU 72, the traveling ECU 73 of the traffic control apparatus calculates the control information, i.e., control parameters, for each vehicle 5. This makes it unnecessary to, for example, provide multiple autonomous sensors in the individual vehicles 5, or to mount a high-performance control unit on the individual vehicles 5. This helps to significantly simplify the system of the vehicle 5.

The control information for each vehicle 5 is calculated by the traveling ECU 73 of the traffic control apparatus 70. This facilitates, for example, upgrade of a program for the calculation of the control information, making it possible to apply the latest driving control to the vehicles 5 with various specifications.

In this case, each vehicle 5 may include at least one autonomous sensor, such as the camera unit 11. This enables the information recognition ECU 72 to accurately recognize even a pedestrian's sudden running-out, for example, which is sometimes difficult to sense by the monitoring apparatus 50.

In addition, a transceiver compliant with a high-reliability and low-delay communication system (e.g., a fifth-generation mobile communication system) may be used as each of the transceivers 18, 53, and 74. This makes it possible to suppress a delay due to communication to a very short delay, which makes it possible to recognize the road traffic information in real time. This enables the control information based on the road traffic information recognized in real time to be reflected in each vehicle 5 in real time.

Also for another vehicle 5 that is influenced by the behavior of the vehicle 5 for which the control information has been set, the traveling ECU 73 may calculate control information for contact avoidance, for example, on an as-needed basis. This makes it possible to quickly execute a control for contact avoidance on the other vehicle 5. In other words, the control information for each vehicle 5 present within the traffic control area may be collectively calculated by the traveling ECU 73 in the traffic control apparatus 70. Thus, before the vehicle 5 for which the control information has been set actually exhibits a behavior for contact avoidance, for example, it is possible to find the influence of the vehicle 5 on another vehicle 5 beforehand, on the basis of the control information for the vehicle 5. This makes it possible to calculate control information for the other vehicle 5 beforehand, making it possible to execute a responsive control for contact avoidance on the other vehicle 5.

In the example embodiments described above, the communication ECU 21, the traveling ECU 22, the E/G ECU 23, the PS ECU 24, the BK ECU 25, the alerting ECU 26, the communication ECU 52, the communication ECU 71, the information recognition ECU 72, and the traveling ECU 73 may include a known microcomputer and peripheral equipment thereof. The known microcomputer may include a CPU, a RAM, a ROM, and a nonvolatile storage, for example. The ROM may store, in advance, fixed data such as a program to be executed by the CPU or a data table. All or a part of functions of the communication ECU 21, the traveling ECU 22, the E/G ECU 23, the PS ECU 24, the BK ECU 25, the alerting ECU 26, the communication ECU 52, the communication ECU 71, the information recognition ECU 72, and the traveling ECU 73 may be configured by a logic circuit or an analog circuit. Processing of various programs may be implemented by an electronic circuit such as a FPGA.

The technology described above is not limited to the foregoing example embodiments, and various modifications may be made in the implementation stage without departing from the gist of the technology.

For example, although the foregoing example embodiment describes an example in which the vehicle 5 is mounted with the camera unit 11 including a stereo camera, the technology is not limited thereto. In place of the camera unit including the stereo camera, for example, it is also possible to apply a camera unit including a monocular camera, a millimeter-wave radar, or a light detection and ranging (LiDAR). Similarly, also in the monitoring apparatus 50, it is also possible to apply a camera unit including a stereo camera, a millimeter-wave radar, or a LiDAR, in place of the camera unit 51 including a monocular camera.

Figure 11:
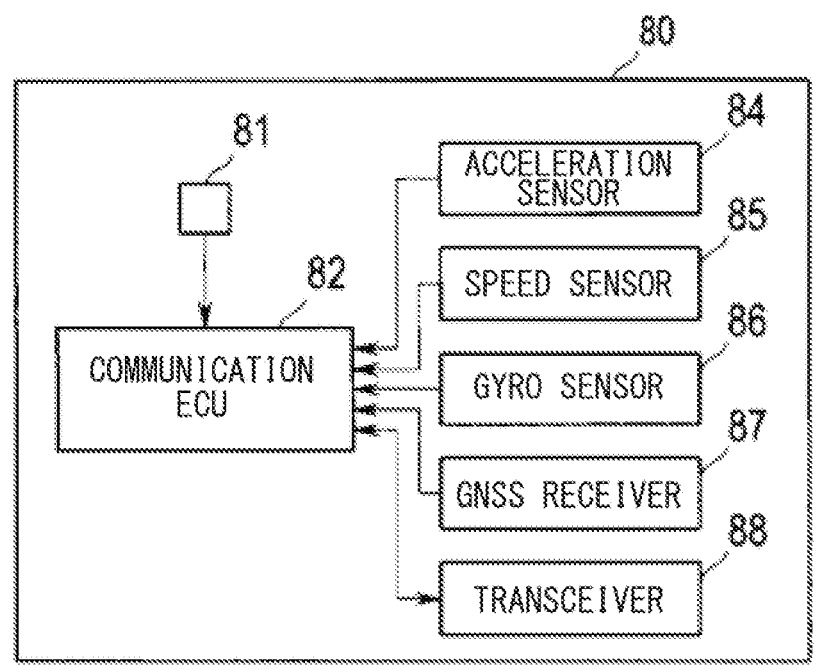
FIG. 11 is a configuration diagram illustrating a part of a communication terminal according to a modification example.

Furthermore, for example, a communication terminal 80, such as a smartphone or a mobile phone, may be used to provide the first road-traffic detection information to the traffic control apparatus 70, as illustrated in FIG. 11. Thus, in one embodiment, the communication terminal 80 may serve as the "mobile body".

In this case, the communication terminal 80 may include a camera unit 81, an acceleration sensor 84, a speed sensor 85, a gyro sensor 86, and a GNSS receiver 87, for example, coupled to a communication ECU 82. In one embodiment, the camera unit 81, the acceleration sensor 84, the speed sensor 85, the gyro sensor 86, and the GNSS receiver 87, for example, may serve as the "first road-traffic detection information acquisition unit". The communication terminal 80 may also include a transceiver 88 coupled to the communication ECU 82. In one embodiment, the transceiver 88 may serve as the "first communicator".

Note that the camera unit 81, the acceleration sensor 84, the speed sensor 85, the gyro sensor 86, and the GNSS receiver 87 may correspond to the camera unit 11, the acceleration sensor 14, the speed sensor 15, the gyro sensor 16, and the GNSS receiver 17 according to the foregoing example embodiment. The communication ECU 82 may correspond to the communication ECU 21 according to the foregoing example embodiment. The transceiver 88 may correspond to the transceiver 18 according to the foregoing example embodiment. Therefore, a detailed description of these elements is omitted.

Figure 12:
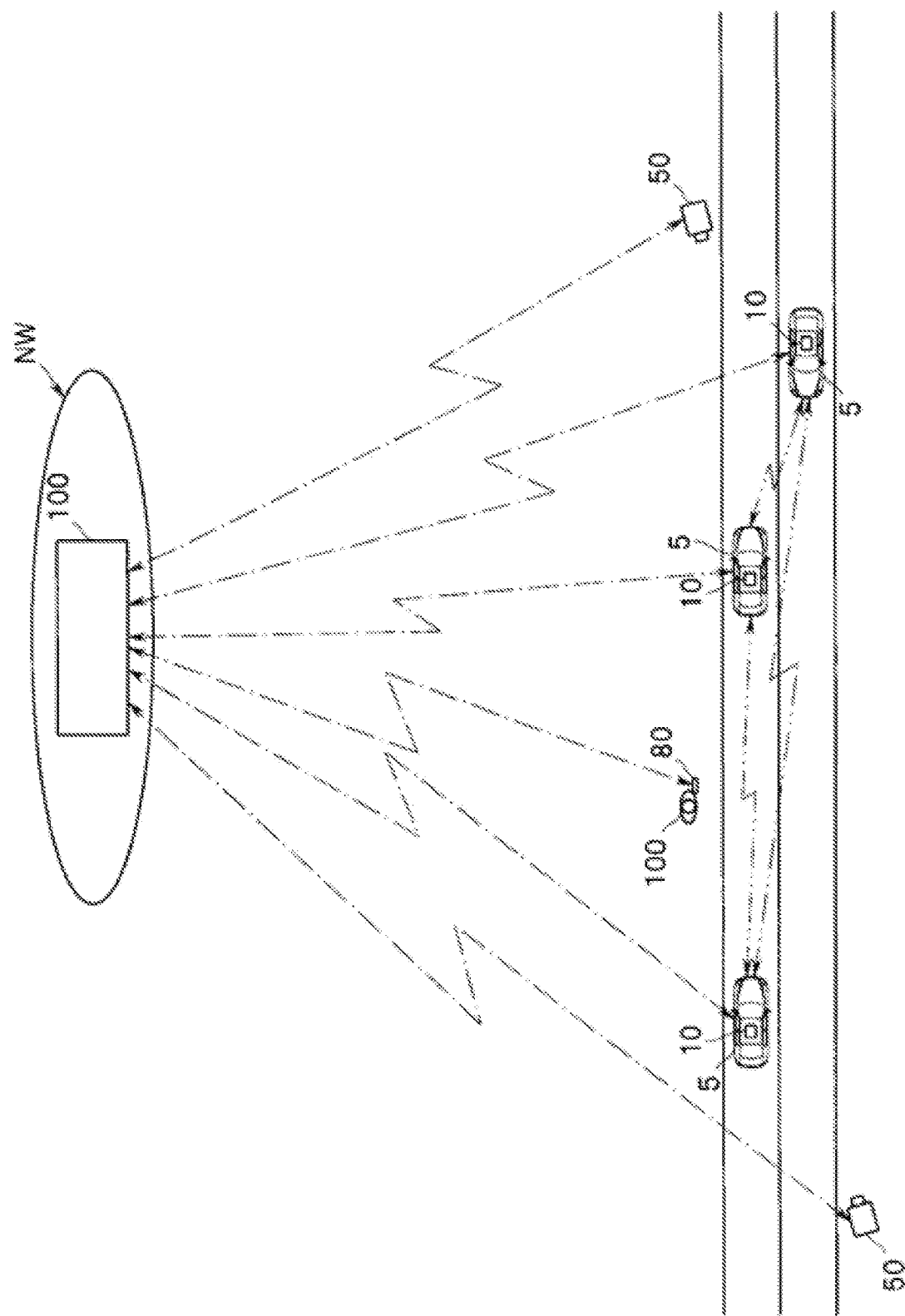
FIG. 12 is an explanatory diagram illustrating vehicle driving control apparatuses, the communication terminal, and monitoring apparatuses coupled to a traffic control apparatus by high-speed wireless communication, according to the modification example.

The communication terminal 80 described above may be held by a pedestrian 100, for example, within the traffic control area, as illustrated in FIG. 12. The communication terminal 80 may thus acquire first road-traffic detection information, and may transmit the acquired first road-traffic detection information to the traffic control apparatus 70.

Figure 13:
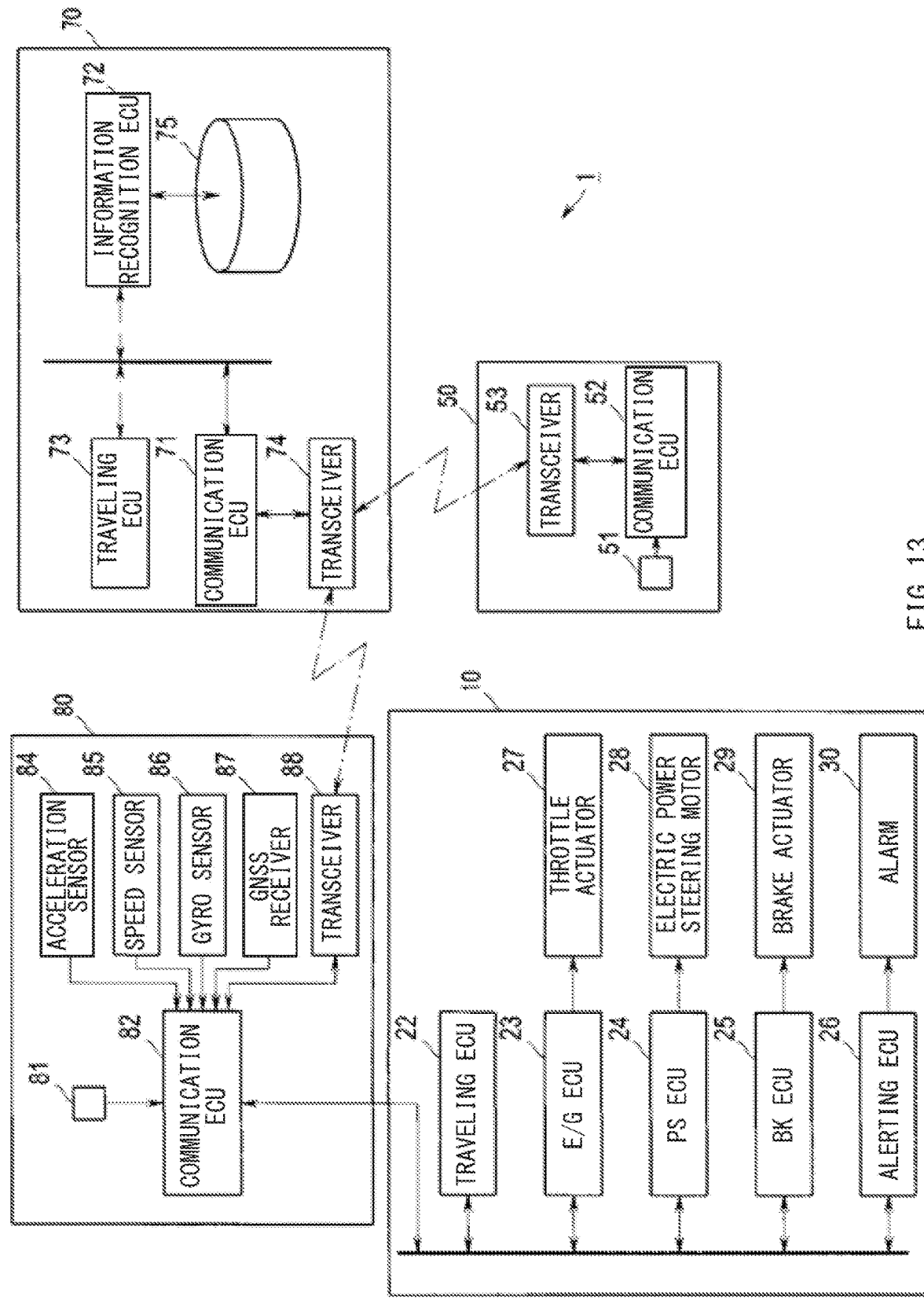
FIG. 13 is an outline configuration diagram illustrating a vehicle driving control system including the communication terminal according to the modification example.

For example, the communication terminal 80 may be applied to the vehicle 5 mounted with the driving control apparatus not including a camera unit or a transceiver, as illustrated in FIG. 13. In this case, the communication terminal 80 fixed to a dashboard, for example, of the vehicle 5 may be coupled to the driving control apparatus 10 via a communication cable, such as a universal serial bus (USB) cable. This enables the communication terminal 80 to acquire first road-traffic detection information, and to transmit the acquired first road-traffic detection information to the traffic control apparatus 70. The communication terminal 80 may also supply the control information received from the traffic control apparatus 70 to the E/G ECU 23, the PS ECU 24, the BK ECU 25, and the alerting ECU 26.

The foregoing example embodiment describes a configuration in which only control information related to safety of each vehicle is calculated by the traffic control apparatus, and control information of a control for convenience, such as a cruise control, is calculated by the traveling control unit provided in each vehicle. However, the technology is not limited thereto. For example, the traffic control apparatus may be configured to calculate the control information for convenience. In this case, the traveling ECU, for example, provided in the driving control apparatus of each vehicle may be omitted as appropriate.

Figure 14:
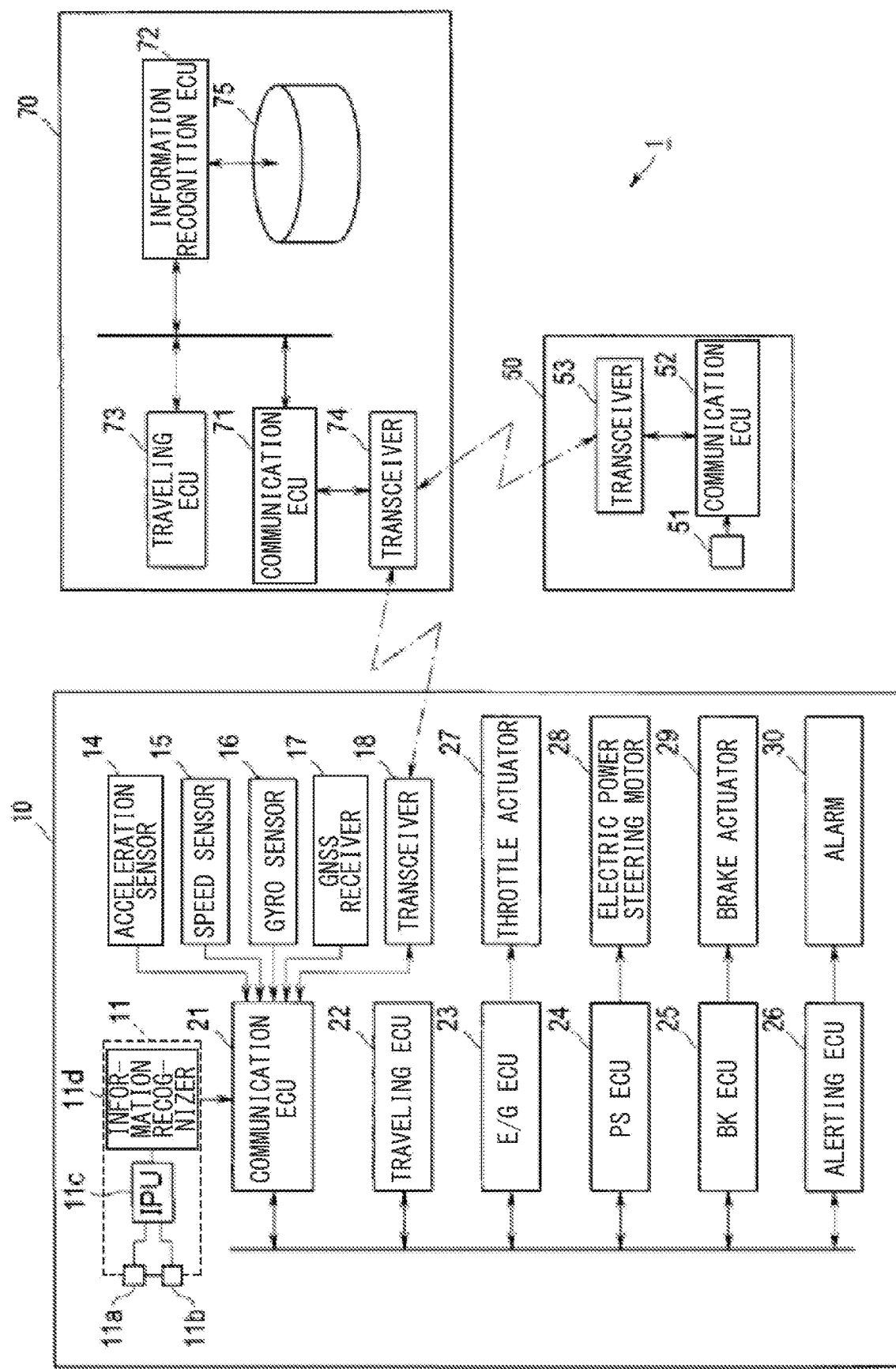
FIG. 14 is an outline configuration diagram illustrating a vehicle driving control system according to one example embodiment of the technology.
Figure 15:
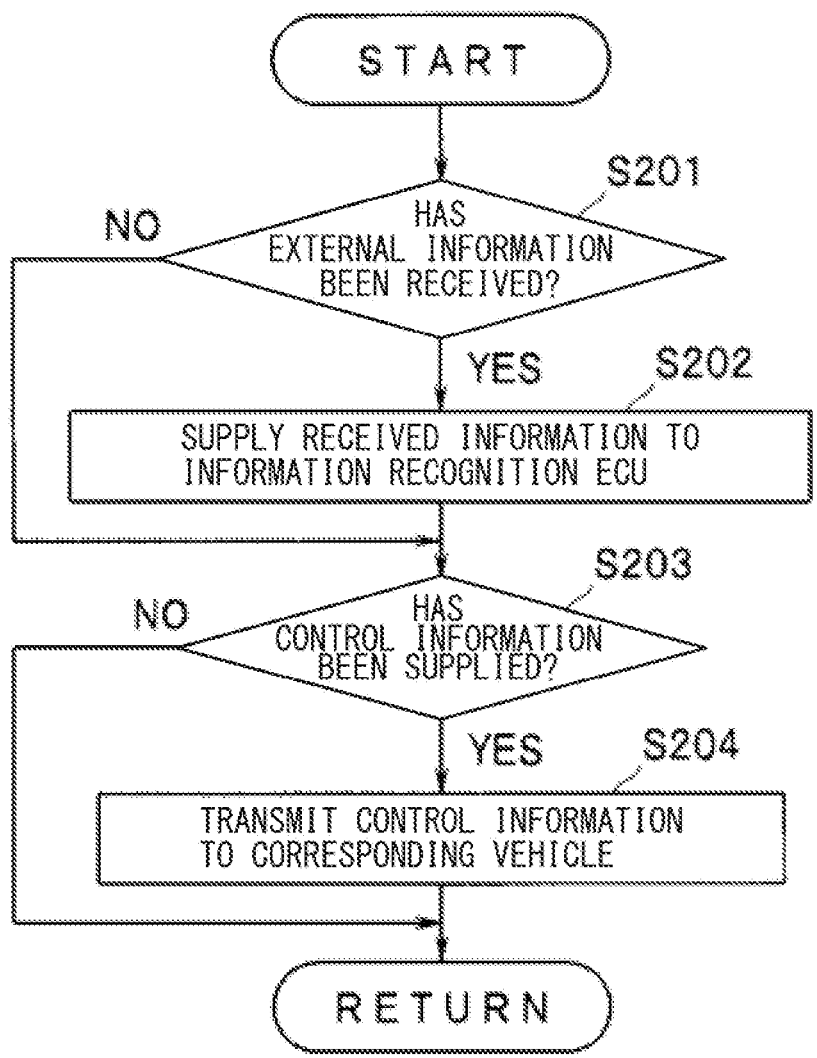
FIG. 15 is a flowchart illustrating a communication control routine that is executed by a communication control unit of a traffic control apparatus according to one example embodiment of the technology.

A description is given next of a second example embodiment of the technology, with reference to FIG. 14 and FIG. 15. Elements similar to those in the first example embodiment described above are denoted with the same reference signs, and descriptions thereof are omitted as appropriate.

The example embodiment may reduce information that is transmitted from the transceiver 74 of the traffic control apparatus 70 to the transceiver 18 of the driving control apparatus 10.

In one example, the information that is transmitted from the transceiver 74 of the traffic control apparatus 70 to the transceiver 18 of the driving control apparatus 10 in the example embodiment may be only control information related to ensuring of safety of the vehicle 5, e.g., the emergency braking control and the emergency steering control for an obstacle.

In other words, in the example embodiment, road map information may not be transmitted from the transceiver 74 to the transceiver 18. For example, as illustrated in FIG. 15, the communication ECU 71 of the traffic control apparatus 70 may perform only the processes of step S201 to step S204 according to the first example embodiment described above.

Accordingly, for example, in the vehicle 5 configured to perform a driving assistance control for an improvement in convenience, the camera unit 11 may include an information recognizer 11*d* that recognizes road traffic information on the basis of the distance image information generated by the IPU 11*c*.

For example, the information recognizer 11*d* may calculate, on the basis of the distance image information, lane lines that divide a road around the vehicle 5, and calculate a road curvature of lane lines that define right and left of the traveling course, and a lane width, for example. The information recognizer 11*d* may also perform a process of recognizing various three-dimensional objects by performing predetermined pattern matching, for example, on the distance image information.

The road traffic information thus recognized by the information recognizer 11*d* may be supplied to the traveling ECU 22. The traveling ECU 22 may calculate, for example, control information for the adaptive cruise control and the lane keep control, on the basis of the road traffic information supplied from the information recognizer 11*d*.

In the example embodiment in which road traffic information is not transmitted from the traffic control apparatus 70, as elements for recognition of the road traffic information, it is possible to provide an autonomous sensor, such as a millimeter-wave radar or a laser radar, and a locator unit, for example, as appropriate, in addition to the camera unit 11 or in place of the camera unit 11. The locator unit may include road map information independent of the road map information of the traffic control apparatus 70.

According to such an example embodiment, the information that is transmitted from the transceiver 74 of the traffic control apparatus 70 to the transceiver 18 of the vehicle 5 may be limited to the control information for the ensuring of safety of the vehicle 5. This makes it possible to significantly reduce the communication load from the transceiver 74 to the transceiver 18. This enables the control information with high precision calculated by the traveling ECU 73 of the traffic control apparatus 70 to be instantaneously transmitted to the target vehicle 5, making it possible to achieve the control for the ensuring of safety of the vehicle 5 at a higher level.

In other words, for example, even in a case where traveling control based on the control information calculated by the traveling ECU 22 of the driving control apparatus 10 is being executed, it is possible to quickly execute the contact avoidance control based on the control information transmitted from the traffic control apparatus 70 as an interrupt control.

Note that the configurations described in the foregoing example embodiments and modification example may be combined as appropriate. In a case where the above-described concerns may be addressed and the above-described effects may be obtained even if some features are deleted from all the features disclosed in the foregoing example embodiments and modification example, the remaining features may be extracted as a technology. For example, the foregoing example embodiments describe, as an example, the vehicle 5 in which the driving control apparatus 10 includes the traveling ECU 22. However, it is possible to perform the control for the ensuring of safety even on the vehicle 5 not including the traveling ECU 22, on the basis of the control information from the traffic control apparatus 70.

Each of the E/G ECU 23, the PS ECU 24, the BK ECU 25, the information recognition ECU 72, and the traveling ECU 73 illustrated in FIGS. 1, 13, and 14 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the E/G ECU 23, the PS ECU 24, the BK ECU 25, the information recognition ECU 72, and the traveling ECU 73. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of each of the E/G ECU 23, the PS ECU 24, the BK ECU 25, the information recognition ECU 72, and the traveling ECU 73 illustrated in FIGS. 1, 13, and 14.

The invention claimed is:

1. A vehicle driving control system comprising:
   first circuitry to be provided in a vehicle, and configured to acquire first road-traffic detection information including an image that captures an external environment of the vehicle;
   a first communicator to be provided in the vehicle;
   a second communicator to be provided in a traffic control apparatus associated with a traffic control area in which the vehicle is traveling;
   second circuitry to be provided in a monitoring apparatus, and configured to acquire second road-traffic detection information including an image that captures an environment of a road that the monitoring apparatus is monitoring, the monitoring apparatus being disposed at a fixed point on a roadside of the road;
   a third communicator to be provided in the monitoring apparatus;
   third circuitry to be provided in the traffic control apparatus that has road map information including road traffic information, and configured to:
      recognize current road traffic information including information on obstacles on a basis of the image included in the first road-traffic detection information received by the second communicator through the first communicator and the image included in the second road-traffic detection information received by the second communicator through the third communicator;
      update the road map information based on the recognized current road traffic information;
      in response to determining, based on the road map information, that there is an obstacle that is present in the traffic control area, calculate a time-to-contact (TTC) between the vehicle and the obstacle in the traffic control area on the basis of the road map information, the TTC being a time required for the vehicle to come into contact with the obstacle;
      determine whether the TTC is less than or equal to a first threshold; and
      in response to determining that the TTC is less than or equal to the first threshold, i) calculate a first target deceleration rate and ii) include first information indicating the first target deceleration rate in control information to be transmitted from the second communicator to the vehicle;
      determine that there is another vehicle which is traveling within the traffic control area associated with the traffic control apparatus and which is at risk of colliding with the vehicle due to control of the vehicle based on the first target deceleration rate;
      calculate another TTC between the vehicle and the another vehicle on the basis of the road map information;
      determine whether the another TTC is less than or equal to the first threshold; and
      in response to determining that the another TTC is less than or equal to the first threshold, i) calculate another first target deceleration rate and ii) include another first information indicating the another first target deceleration rate in another control information to be transmitted from the second communicator to the another vehicle;
   fourth circuitry to be provided in the vehicle, and configured to perform a driving control on a basis of the control information received by the first communicator, wherein the fourth circuitry is configured to:
      determine whether the control information includes the first information; and
      in response to determining that the control information includes the first information, perform the driving control to decelerate the vehicle at the first target deceleration rate; and
   another fourth circuitry to be provided in the another vehicle, and configured to perform a driving control on a basis of the another control information received by another first communicator, wherein the another fourth circuitry is configured to:
      determine whether the another control information includes the another first information; and
      in response to determining that the another control information includes the another first information, perform the driving control to decelerate the another vehicle at the another first target deceleration rate.

2. A vehicle traffic control apparatus comprising:
   a communicator; and
   a circuitry coupled to the communicator and having road map information including road traffic information, and configured to:
      acquire from a vehicle traveling in a traffic control area, first road-traffic detection information including an image that captures an external environment of the vehicle, and from a monitoring apparatus disposed at a fixed point on a roadside in the traffic control area, second road-traffic detection information including an image that captures an environment of a road that the monitoring apparatus is monitoring;
      recognize current road traffic information including information on obstacles on a basis of the image included in the first road-traffic detection information and the image included in the second road-traffic detection information;
      update the road map information based on the recognized current road traffic information;
      in response to determining, based on the road map information, that there is an obstacle that is present in the traffic control area, calculate a time-to-contact (TTC) between the vehicle and the obstacle in the traffic control area on a basis of the road map information, the TTC being a time required for the vehicle to come into contact with the obstacle;
      determine whether the TTC is less than or equal to a first threshold; and
      in response to determining that the TTC is less than or equal to the first threshold, i) calculate a first target deceleration rate and ii) control the vehicle to decelerate at the first target deceleration rate by transmitting first information indicating the first target deceleration rate to the vehicle via the communicator;
      determine that there is another vehicle which is traveling within the traffic control area and which is at risk of colliding with the vehicle due to control of the vehicle based on the first target deceleration rate;
      calculate another TTC between the vehicle and the another vehicle on the basis of the road map information;
      determine whether the another TTC is less than or equal to the first threshold; and
      in response to determining that the another TTC is less than or equal to the first threshold, i) calculate another first target deceleration rate and ii) control the another vehicle to decelerate at the another first target deceleration rate by transmitting another first information indicating the another first target deceleration rate to the another vehicle via the communicator.

3. The vehicle driving control system according to claim 1,
wherein the third circuitry is configured to:
  determine whether the TTC is less than or equal to a second threshold less than the first threshold; and
  in response to determining that the TTC is less than or equal to the second threshold, i) calculate a second target deceleration rate higher than the first target deceleration rate, ii) include second information indicating the second target deceleration rate in the control information and iii) exclude the first information from the control information, and
wherein the fourth circuitry is configured to:
  determine whether the control information includes the second information;
  in response to determining that the control information includes the first information and does not include the second information, perform the driving control to decelerate the vehicle at the first target deceleration rate; and
  in response to determining that the control information includes the second information, perform the driving control to decelerate the vehicle at the second target deceleration rate.

4. The vehicle traffic control apparatus according to claim 2,
wherein the circuitry is configured to:
  determine whether the TTC is less than or equal to a second threshold less than the first threshold; and
  in response to determining that the TTC is less than or equal to the second threshold, i) calculate a second target deceleration rate higher than the first target deceleration rate and ii) control the vehicle to decelerate at the second target deceleration rate by transmitting second information indicating the second target deceleration rate to the vehicle via the communicator.

* * * * *